United States Patent
Nomura et al.

(10) Patent No.: US 6,486,876 B1
(45) Date of Patent: *Nov. 26, 2002

(54) PAPERLESS ACCOUNTING SYSTEM

(75) Inventors: Sakae Nomura, Wako (JP); Shinji Suzuki, Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/311,888

(22) Filed: Sep. 26, 1994

Related U.S. Application Data

(63) Continuation of application No. 07/690,852, filed on Apr. 24, 1991, now abandoned.

(30) Foreign Application Priority Data

| Jan. 29, 1991 | (JP) | 3-9203 |
| Jan. 29, 1991 | (JP) | 3-9214 |
| Jan. 29, 1991 | (JP) | 3-9224 |
| Jan. 29, 1991 | (JP) | 3-9230 |
| Jan. 29, 1991 | (JP) | 3-9240 |
| Jan. 29, 1991 | (JP) | 3-9255 |
| Jan. 29, 1991 | (JP) | 3-9280 |

(51) Int. Cl.$^7$ .................................. G06T 1/00
(52) U.S. Cl. ..................................... 345/352
(58) Field of Search ..................... 395/161, 352–354, 395/766–769; 364/406, 408, 413.01, 401, 479.04, 479.07; 705/14; 235/381, 382, 493, 494; 340/825.35

(56) References Cited

U.S. PATENT DOCUMENTS

| 4,144,567 A | * | 3/1979 | Tadakuma et al. ........... 364/405 |
| 4,264,808 A | * | 4/1981 | Owens et al. ........... 382/138 X |
| 4,604,696 A | * | 8/1986 | Suganuma et al. ......... 364/401 |
| 4,700,297 A | * | 10/1987 | Hagel, Sr. et al. ......... 364/408 |
| 4,774,664 A | * | 9/1988 | Campbell et al. ........... 364/408 |
| 4,837,693 A | * | 6/1989 | Schutz ........................ 364/408 |
| 4,852,000 A | * | 7/1989 | Webb et al. ................. 364/406 |
| 4,882,675 A | * | 11/1989 | Nichtberger et al. .......... 705/14 |
| 4,987,538 A | * | 1/1991 | Johnson et al. ........ 364/413.01 |
| 5,125,075 A | * | 6/1992 | Goodale et al. ............. 364/419 |
| 5,138,549 A | * | 8/1992 | Bern .......................... 364/408 |

FOREIGN PATENT DOCUMENTS

| JP | 52132756 | * | 7/1977 |
| JP | 5696363 A | | 8/1981 |
| JP | 5736487 A | | 2/1982 |
| JP | 6125347 A | | 2/1986 |
| JP | 621063 A | | 1/1987 |
| JP | 6217862 A | | 1/1987 |
| JP | 6224364 A | | 2/1987 |
| JP | 6298459 A | * | 5/1987 |
| JP | 62113269 A | | 5/1987 |
| JP | 62123565 A | | 6/1987 |
| JP | 62159270 A | | 7/1987 |
| JP | 62175863 A | * | 8/1987 |
| JP | 62206664 A | * | 9/1987 |
| JP | 6375968 A | * | 4/1988 |
| JP | 63141176 A | | 6/1988 |
| JP | 63147263 A | | 6/1988 |
| JP | 225913 A | | 1/1990 |
| JP | 243672 A | | 2/1990 |
| JP | 2196369 A | | 8/1990 |
| JP | 2247773 A | | 10/1990 |
| JP | 2249047 A | | 10/1990 |

OTHER PUBLICATIONS

Steinberg, D., "Bank of America, Western Union From Electronic Network Alliance," PC Week vol. 5 No. 29 (Jul. 18, 1988) pp. C1–C2.*

* cited by examiner

*Primary Examiner*—Almis R. Jankus
(74) *Attorney, Agent, or Firm*—Birch, Stewart Kolasch & Birch, LLP

(57) ABSTRACT

In the paperless accounting system of the present invention, even if a person is not accustomed to accounting, a slip can be easily formed by simply inputting data of necessary items displayed on menu screens having different menus in accordance with different types of slips. Input errors of input slip data are automatically checked. Even if erroneous data are input, they can be corrected on the spot. The finished electronic slip files are assigned with slip numbers, respectively.

1 Claim, 36 Drawing Sheets

Fig. 2

| KEY ITEM | SLIP ISSUANCE DEPARTMENT INFORMATION ITEM | SLIP HISTORY INFORMATION ITEM | APPLICATION INFORMATION ITEM | |
|---|---|---|---|---|
| | | | SLIP COMMON INFORMATION ITEM | JOURNAL INFORMATION ITEM |
| ELECTRONIC SLIP DATA MANAGEMENT NO. | BRANCH OFFICE CODE | SETTLEMENT PLACE CLASSIFICATION | ATTACHED CARD P/O CLASSIFICATION | CREDIT/DEBIT SIDE CLASSIFICATION |
| NEXT SETTLEMENT INFORMATION | DEPARTMENT CODE | SETTLEMENT ROUTE COUNT | ATTACHED CARD REISSUANCE COUNT | DETAILS NO. |
| STATUS | SLIP ISSUER POST NO. | HISTORY INFORMATION COUNT | ATTACHED CARD REISSUANCE DATE | EXPLANATION |
| ACCOUNTING DATE | SLIP ISSUER-IN-CHARGE POST NO. | BRANCH OFFICE CODE | ACCOUNTING DATE | CONTENT NO. |
| SLIP ISSUER POST NO. | SLIP ISSUANCE DATE | DEPARTMENT CODE | TRANSFER NO. | CONTENT STATEMENT |
| SLIP ISSUANCE DATE | | HANDLER POST NO. | DEBIT NOTE NO. | ACCOUNT TITLE CODE |
| EXPECTED LIQUIDATION DATE | | HANDLING DATE | ORIGINAL DATA MANAGEMENT NO. | AMOUNT |
| ACCOUNT TITLE IDENTIFICATION CODE | | STATUS | | NECESSARY ACCOUNT TITLE ITEM |

RECORD STRUCTURE OF ELECTRONIC SLIP

| ELECTRONIC SLIP DATA MANAGEMENT NO. | | | | | NEXT SETTLEMENT INFORMATION | |
|---|---|---|---|---|---|---|
| BRANCH OFFICE CODE | DATE | | SLIP ID | MANAGEMENT NO. | BRANCH OFFICE CODE | DEPART-MENT CODE |
| | YY | MM | ID | SEQ | CORREC-TION CLASSIFIC-ATION | | |
| 5 | 2 | 2 | 2 | 5 | 1 | 5 | 5 |

STRUCTURE OF SUPERDESCRIPTOR KZ

FIG. 4

| NEXT SETTLEMENT INFORMATION | | STATUS | ELECTRONIC SLIP DATA MANAGEMENT NO. | | | |
|---|---|---|---|---|---|---|
| BRANCH OFFICE CODE | DEPARTMENT CODE | | BRANCH OFFICE CODE | DATE | | SLIP ID |
| | | | | YY | MM | ID |
| 5 | 5 | 4 | 5 | 2 | 2 | 2 |

STRUCTURE OF SUPERDESCRIPTOR KY

FIG. 5

| ACCOUNT-ING DATE; | | ACCOUNT TITLE CODE | STATUS | SLIP ISSUANCE DEPARTMENT CODE | AUXILIARY CODE |
|---|---|---|---|---|---|
| YY | MM | | | | |
| 2 | 2 | 5 | 4 | 5 | 3 |

STRUCTURE OF SUPERDESCRIPTOR KX

FIG. 6

| SLIP ISSUANCE –IN-CHARGE POST NO. | SLIP ISSUANCE DATE | | | SLIP ISSUANCE DEPARTMENT CODE | SLIP ID | ACCOUNT TITLE CODE |
|---|---|---|---|---|---|---|
| | YY | MM | DD | YY | ID | |
| 7 | 2 | 2 | 2 | 5 | 2 | 5 |

STRUCTURE OF SUPERDESCRIPTOR KW

FIG.7

| STATUS | SLIP ID | SLIP ISSUANCE DEPARTMENT CODE | SLIP ISSUANCE –IN-CHARGE POST NO. | DEBIT NOTE REQUEST · TRANSFER DESTINATION DEPARTMENT |
|---|---|---|---|---|
| | ID | | | |
| 4 | 2 | 5 | 7 | 5 |

STRUCTURE OF SUPERDESCRIPTOR KV

FIG.8

| | | RETRIEVAL KEY ITEM | | | | | | | | | | | RETRIEVAL PATTERN |
|---|---|---|---|---|---|---|---|---|---|---|---|---|---|
| | | SLIP MANAGEMENT NO. | | | NEXT SETTLEMENT | | | SLIP ISSUANCE DEPARTMENT CODE | SLIP ISSUANCE PERSON-IN-CHARGE POST NO. | SLIP ISSUANCE DATE | EXPECTED LIQUID-ATION DATE | ACCOUNT TITLE CODE | |
| | PROCESSING FORM | BRANCH OFFICE CODE | DATE | SLIP ID | MAN-AGE-MENT NO. | BRANCH OFFICE CODE | DEPART-MENT CODE | STATUS | | | | | |
| INPUT / SLIP IS-SUANCE | DOMESTIC BUSINESS TRIP EXPENSE REQUEST | ○ | ○ | ○ | ○ | ○ | ○ | | | | | ○ | |
| | DOMESTIC BUSINESS TRIP EXPENSE LIQUIDATION | ○ | ○ | ○ | ○ | ○ | ○ | | | | | ○ | |
| | ADVANCE PAYMENT REQUEST | ○ | ○ | ○ | ○ | ○ | ○ | | | | | ○ | |
| | ADVANCE PAYMENT LIQUIDATION | ○ | ○ | ○ | ○ | ○ | ○ | | | | | ○ | |
| | CASH LIQUIDATION | ○ | ○ | ○ | ○ | ○ | ○ | | | | | ○ | |
| | DAILY PAYMENTS | ○ | ○ | ○ | ○ | ○ | ○ | | | | | ○ | |
| | AFFILIATED COMPANY DEBIT NOTE RECEPTION PROCESSING | ○ | ○ | ○ | ○ | ○ | ○ | | | | | ○ | |
| | AFFILIATED COMPANY DEBIT NOTE ISSUANCE PROCESSING | ○ | ○ | ○ | ○ | ○ | ○ | | | | | ○ | |
| | BRANCH OFFICE TRANSFER RECEPTION PROCESSING | ○ | ○ | ○ | ○ | ○ | ○ | | | | | ○ | |
| | BRANCH OFFICE TRANSFER ISSUANCE PROCESSING | ○ | ○ | ○ | ○ | ○ | ○ | | | | | ○ | |
| | INTERDEPARTMENT TRANSFER RECEPTION PROCESSING | ○ | ○ | ○ | ○ | ○ | ○ | | | | | ○ | |
| | INTERDEPARTMENT TRANSFER ISSUANCE PROCESSING | ○ | ○ | ○ | ○ | ○ | ○ | | | | | ○ | |
| | OUR PRODUCT ACQUIREMENT RECEPTION PROCESSING | ○ | ○ | ○ | ○ | ○ | ○ | | | | | ○ | |
| | FIXED ASSET SALE PROCESSING | ○ | ○ | ○ | ○ | ○ | ○ | | | | | ○ | |
| | GENERAL TRANSACTION | ○ | ○ | ○ | ○ | ○ | ○ | | | | | ○ | |
| | EXPENSE PLANNING NO. DIVISION | ○ | ○ | ○ | ○ | ○ | ○ | | | | | ○ | |
| | BOOK CLOSING PROCESSING | ○ | ○ | ○ | ○ | ○ | ○ | | | | | ○ | |
| | FOREIGN BRANCH OFFICE ADVANCE PAYMENT LIQUIDATION | ○ | ○ | ○ | ○ | ○ | ○ | | | | | ○ | |
| | EXPENSE SHARING DEPARTMENT REASSIGNMENT | ○ | ○ | ○ | ○ | ○ | ○ | | | | | ○ | |
| VERIFIC-ATION | APPROVAL / VERIFICATION REGISTRATION | ○ | ○ | | ○ | | | ○ | ○ | ○ | | | ○ |
| | | | | | | | | ○ | | ○ | ○ | | ○ |
| | SETTLEMENT (WITH ATTACHED CARD) / VERIFICATION REGISTRATION | | | | | | | ○ | | | | ○ | ○ |
| | | | | | | | | ○ | ○ | ○ | | ○ | |
| | SETTLEMENT (WITHOUT ATTACHED CARD) / VERIFICATION REGISTRATION | ○ | ○ | | | | | ○ | ○ | ○ | | ○ | ○ |
| | | | | | | | | ○ | ○ | ○ | ○ | ○ | |
| OUTPUT | NONLIQUIDATED ELECTRONIC SLIP SPECIFICATION RETRIEVAL | | | | | | | ○ | ○ | ○ | ○ | ○ | ○ |
| | ELECTRONIC SLIP RETRIEVAL | | | | | | | ○ | | ○ ○ ○ | ○ | | ○ |
| | CHECK OF RECEIVED AND NON-PROCESSED ELECTRONIC SLIP | | | | | | | ○ | ○ | ○ ○ ○ | | | ○ |
| | CHECK OF APPROVAL AND SETTLEMENT STATES OF ELECTRONIC SLIPS | | | | | | | | | ○ ○ | | | ○ |
| | CHECK OF NONVERIFICATION | | | | | | | ○ | | ○ ○ | | | ○ |

FIG. 9

| PROCESSING | | | DATA BEFORE PROCESSING | DATA AFTER PROCESSING |
|---|---|---|---|---|
| SLIP ISSUANCE | INPUT | | — | 3100 |
| | CORRECTION | | 3100 2900 | 3100 |
| | CANCELLATION | | 3100 2900 | — |
| APPROVAL | INPUT | APPROVED | 3100 | 4100 |
| | | DISAPPROVED | 3100 | 2900 |
| | CANCELLATION OF APPROVED DECISION | | 4100 | 2900 |
| | CANCELLATION OF DISAPPROVED DECISION | | 2900 | 4100 |
| SETTLE-MENT (1) | INPUT | APPROVED | 4100 | 5100 |
| | | DISAPPROVED | 4100 | 3900 |
| | CANCELLATION OF APPROVED DECISION | | 5100 | 3900 |
| | CANCELLATION OF DISAPPROVED DECISION | | 3900 | 5100 |
| SETTLE-MENT (2) | INPUT | APPROVED | 5100 | 6100 |
| | | DISAPPROVED | 5100 | 4900 |
| | CANCELLATION OF APPROVED DECISION | | 6100 | 4900 |
| | CANCELLATION OF DISAPPROVED DECISION | | 4900 | 6100 |

MANAGEMENT BY STATUS INFORMATION

*FIG. 11*

INPUT PROCESSING

FIG. 13

```
|DOMESTIC BUSINESS TRIP|                      90.11.09
|EXPENSE REQUEST INPUT|                      14:09:06
                                             PAGE 001

SELECT DESIRED ITEM.    1 <== 1 INPUT  2 CANCEL  3 ABROAD
DEPARTMENT NO.?    1234        FIRST SECTION OF SALES
                               DEPARTMENT
PERSONAL ID?       21177       TARO YAMADA
REQUEST DATE       NOVEMBER 9, 1990
SCHEDULE OF BUSINESS      -DAY STAY FROM NOVEMBER 11, 1990
TRIP?                     TO NOVEMBER 13, 1990
HOTEL CHARGE?             <== 1 DEMANDABLE HOTEL CHARGE
                              2 UNDEMANDABLE HOTEL CHARGE
USE OF COUPON TICKET?     <== 1 USE   2 NONUSE
TRANSPORTATION FOR COUPON <== 1 BULLET TRAIN   2 AIRPLANE
TICKET?
ONE-WAY/ ROUND COUPON     <== 1 ONE-WAY TICKET
TICKET?                       2 ROUND TICKET

COUPON TICKET FOR WHERE?  <== (BULLET TRAIN);

(AIRPLANE);
APPROXIMATE TRANSPORTATION    PREPAYMENTS REQUIRED?
EXPENSE                          <== 1 UNNECESSARY
____  (UNIT : ¥1,000)         AMOUNT OF PREPAYMENTS
                              AMOUNT OF COUPON TICKET
                              AMOUNT OF TRAVEL TICKET

<<<< INPUT ALL NECESSARY ITEMS.>>>>
        CONTINUE?    <== E = END  N = NEXT
```

*FIG. 14*

```
|--------DOMESTIC BUSINESS TRIP--------|
| EXPENSE REQUEST INPUT                |                    90.11.09
|--------------------------------------|                    14:09:06
                                                            PAGE 001

SELECT DESIRED ITEM.     1 <==   1 INPUT    2 CANCEL    3 ABROAD
DEPARTMENT NO.?    1 2 3 4       FIRST SECTION OF SALES
                                 DEPARTMENT
PERSONAL ID?       2 1 1 7 7     TARO YAMADA
REQUEST DATE       NOVEMBER  9, 1990
SCHEDULE OF BUSINESS     -DAY STAY FROM NOVEMBER 11, 1990
TRIP?                 TO NOVEMBER 13, 1990
HOTEL CHARGE?            1 <==   1 DEMANDABLE HOTEL CHARGE
                                 2 UNDEMANDABLE HOTEL CHARGE
USE OF COUPON TICKET?    1 <==   1 USE   2 NONUSE
TRANSPORTATION FOR COUPON<==     1 BULLET TRAIN   2 AIRPLANE
TICKET?
ONE-WAY/ROUND COUPON      <==    1 ONE-WAY TICKET
TICKET?                          2 ROUND TICKET

COUPON TICKET FOR WHERE?  <==    (BULLET TRAIN);

(AIRPLANE);

APPROXIMATE TRANSPORTATION       PREPAYMENTS REQUIRED?
EXPENSE                                   <==1 UNNECESSARY
         (UNIT: ¥1,000)          AMOUNT OF PREPAYMENTS
                                 AMOUNT OF COUPON TICKET
                                 AMOUNT OF TRAVEL TICKET
       <<<< INPUT ALL NECESSARY ITEMS. >>>>
         CONTINUE?          <==  E=END   N=NEXT
```

FIG. 15

```
|--DOMESTIC BUSINESS TRIP--|         90.11.09
| EXPENSE REQUEST INPUT    |         14:10:14
|--------------------------|         PAGE 001

SELECT DESIRED ITEM.     1 <==  1 INPUT  2 CANCEL  3 ABROAD
DEPARTMENT NO.?      1234       FIRST SECTION OF SALES
                                DEPARTMENT
PERSONAL ID?       21177        TARO YAMADA
REQUEST DATE       NOVEMBER 9, 1990
SCHEDULE OF BUSINESS -DAY STAY FROM NOVEMBER 11, 1990
TRIP?                TO NOVEMBER 13, 1990
HOTEL CHARGE?            1 <==  1 DEMANDABLE HOTEL CHARGE
                                2 UNDEMANDABLE HOTEL CHARGE
USE OF COUPON TICKET?    1 <==  1 USE  2 NONUSE
TRANSPORTATION FOR       1 <==  1 BULLET TRAIN  2 AIRPLANE
COUPON TICKET?
ONE-WAY/ROUND COUPON 1; 1 <==  1 ONE-WAY TICKET
TICKET?                         2 ROUND TICKET
COUPON TICKET FOR WHERE?
              0; N <==  (BULLET TRAIN); M (MORIOKA) N (NAGOYA)
                        O (OSAKA) H (HIROSHIMA)
                        (AIRPLANE); S (SAPPORO) F (FUKUOKA)
                        G (NAGASAKI) W (OKINAWA) K (KAGOSHIMA)
                                           PREPAYMENTS REQUIRED?
                                              <==1 UNNECESSARY
APPROXIMATE TRANSPORTATION             AMOUNT OF PREPAYMENTS
EXPENSE                                AMOUNT OF COUPON TICKET
       (12,000)                        AMOUNT OF TRAVEL TICKET

<<<< INPUT ALL NECESSARY ITEMS. >>>>
CONTINUE?          <==  E=END  N=NEXT
```

*FIG. 16*

```
|--DOMESTIC BUSINESS TRIP--|      90.11.09
| EXPENSE REQUEST INPUT    |      14:10:52
|--------------------------|      PAGE 001

SELECT DESIRED ITEM.    1 <==   1 INPUT  2 CANCEL  3 ABROAD
DEPARTMENT NO.?  1234           FIRST SECTION OF SALES
                                DEPARTMENT
PERSONAL ID?     21177          TARO YAMADA
REQUEST DATE     NOVEMBER 9, 1990
SCHEDULE OF BUSINESS    -DAY STAY FROM NOVEMBER 11, 1990
TRIP?                   TO NOVEMBER 13, 1990
HOTEL CHARGE?           1 <==   1 DEMANDABLE HOTEL CHARGE
                                2 UNDEMANDABLE HOTEL CHARGE
USE OF COUPON TICKET?   1 <==   1 USE   2 NONUSE
TRANSPORTATION FOR      1 <==   1 BULLET TRAIN   2 AIRPLANE
COUPON TICKET?
ONE-WAY/ROUND COUPON    1;1 <== 1 ONE-WAY TICKET
TICKET?                         2 ROUND TICKET
COUPON TICKET FOR WHERE?
                    O;N <== (BULLET TRAIN); M (MORIOKA) N (NAGOYA)
                            O (OSAKA) H (HIROSHIMA)
                            (AIRPLANE); S (SAPPORO) O (OSAKA) F (FUKUOKA)
                            G (NAGASAKI) W (OKINAWA) K (KAGOSHIMA)
                        PREPAYMENTS REQUIRED?
                                     <== 1 UNNECESSARY
APPROXIMATE TRANSPORTATION   AMOUNT OF PREPAYMENTS
EXPENSE                      AMOUNT OF COUPON TICKET
    012   (12,000)           AMOUNT OF TRAVEL TICKET

<<< INPUT ALL NECESSARY ITEMS. >>>
CONTINUE?               <==  E=END   N=NEXT
```

FIG. 17

```
 _____                          90.11.15
|   DOMESTIC BUSINESS TRIP  |                         14:11:16
|  EXPENSE LIQUIDATION INPUT|                         PAGE 001
 ───────────────────────────

SELECT DESIRED ITEM.   1 <== 1 INPUT   3 CANCEL   4 ABROAD
DEPARTMENT NO.?   1234    FIRST SECTION OF SALES DEPARTMENT
PERSONAL ID NO.?  21177   TARO YAMADA
                              NO. OF EXPECTED  AMOUNT OF       ADVANCE PAYMENT
SPECIFY BUSINESS TRIP 1 <==   LIQUIDATION DATES ADVANCE PAYMENT REQUEST DATE
TO BE LIQUIDATED.             1 YY MM DD                         YY MM DD
                              2 YY MM DD                   ,     YY MM DD

PURPOSE OF
LIQUIDATION?             1 LIQUIDATION       2 CANCELLATION
LIQUIDATION                                    OF BUSINESS TRIP
DUE DATE?          19YY (YEAR), MM (MONTH), DD (DAY)
SCHEDULE      FROM  19YY (YEAR), MM (MONTH), DD (DAY)
                TO  19YY (YEAR), MM (MONTH), DD (DAY)
INPUT ACTUAL ROUTE.
             DATE OF   PLACE OF                DATE OF  PLACE OF
             DEPARTURE DEPARTURE  TIME         ARRIVAL  ARRIVAL    TIME
FORWARD
ROUTE        MM DD                HHMM                             MM DD
BACKWARD
ROUTE        MM DD                HHMM                             MM DD
TRANSPORTATION ADVANCE?
     <<< INPUT ALL NECESSARY ITEMS. >>>>
     CONTINUE?              <== E=END  N=NEXT  C = CONTINUE
```

```
                    DOMESTIC BUSINESS TRIP              90.11.15
                    EXPENSE LIQUIDATION INPUT           14:11:31
                                                        PAGE 001

SELECT DESIRED ITEM.        1 <== 1 INPUT  3 CANCEL  4 ABROAD
DEPARTMENT NO.?             1234 FIRST SECTION OF SALES DEPARTMENT
PERSONAL ID NO.?            21177 TARO YAMADA
SPECIFY BUSINESS TRIP       1 <== NO. OF EXPECTED    AMOUNT OF        ADVANCE PAYMENT
TO BE LIQUIDATED.                 LIQUIDATION DATES  ADVANCE PAYMENT  REQUEST DATE
                                   1 YY MM DD                          YY MM DD
                                   2 YY MM DD                          YY MM DD

PURPOSE OF
LIQUIDATION?                1 LIQUIDATION              2 CANCELLATION
LIQUIDATION                                              OF BUSINESS TRIP
DUE DATE?
SCHEDULE                    19YY (YEAR), MM(MONTH), DD (DAY)
                       FROM 19YY (YEAR), MM (MONTH), DD (DAY)
                         TO 19YY (YEAR), MM (MONTH), DD (DAY)

INPUT ACTUAL ROUTE
              DATE OF            PLACE OF              DATE OF    PLACE OF
              DEPARTURE          DEPARTURE    TIME     ARRIVAL    ARRIVAL      TIME
FORWARD
ROUTE         MM DD                           HH MM                            MM DD
BACKWARD
ROUTE         MM DD                           HH MM                            MM DD
TRANSPORTATION ADVANCE?
       <<<< INPUT ALL NECESSARY ITEMS >>>>
       CONTINUE?         <==         E=END      N=NEXT       C=CONTINUE
```

FIG.18

```
┌─DOMESTIC BUSINESS TRIP──────┐              90.11.15
│ EXPENSE LIQUIDATION INPUT   │              14:11:57
└─────────────────────────────┘              PAGE 001

SELECT DESIRED ITEM.    1  <== 1 INPUT   3 CANCEL    4 ABROAD
DEPARTMENT NO.?    1234    FIRST SECTION OF SALES DEPARTMENT
PERSONAL ID NO.?  21177    TARO YAMADA
                                    AMOUNT OF            ADVANCE PAYMENT
                      NO. OF EXPECTED   ADVANCE PAYMENT  REQUEST DATE
SPECIFY BUSINESS TRIP 1 <== LIQUIDATION DATES
TO BE LIQUIDATED.
                            1 YY MM DD                   YY MM DD
                            2 YY MM DD       ;           YY MM DD

PURPOSE OF              1 LIQUIDATION       2 CANCELLATION
LIQUIDATION?                                  OF BUSINESS TRIP
LIQUIDATION           NOVEMBER 15, 1990
DUE DATE?
SCHEDULE         FROM 1990 (YEAR), 11 (MONTH), 11 (DAY)
                   TO 1990 (YEAR), 11 (MONTH), 14 (DAY)

INPUT ACTUAL ROUTE.
          DATE OF    PLACE OF    TIME      DATE OF   PLACE OF       TIME
          DEPARTURE  DEPARTURE              ARRIVAL   ARRIVAL

FORWARD   MM DD                  HH MM     MM DD                    HH MM
ROUTE
BACKWARD  MM DD                  HH MM     MM DD                    HH MM
ROUTE

TRANSPORTATION ADVANCE?
     <<< INPUT ALL NECESSARY ITEMS. >>>>
   CONTINUE?        <== E=END  N=NEXT  C = CONTINUE
```

```
 ---------------------------                                    90.11.15
|  DOMESTIC BUSINESS TRIP   |                                  14:12:17
|  EXPENSE LIQUIDATION INPUT|                                  PAGE 001
 ---------------------------
SELECT DESIRED ITEM.   1 <== 1 INPUT    3 CANCEL   4 ABROAD
DEPARTMENT NO.?  1234  FIRST SECTION OF SALES DEPARTMENT
PERSONAL ID NO.? 21177 TARO YAMADA
                         NO. OF EXPECTED  AMOUNT OF          ADVANCE PAYMENT
SPECIFY BUSINESS TRIP 1 <== LIQUIDATION DATES ADVANCE PAYMENT  REQUEST DATE
TO BE LIQUIDATED.
                          1 9 0   11 15      12,000          9 0  11  12
                          2 9 0   11 16      21,000          9 0  11  12

PURPOSE OF
LIQUIDATION?            1 LIQUIDATION       2 CANCELLATION
LIQUIDATION                                   OF BUSINESS TRIP
DUE DATE?
SCHEDULE          NOVEMBER 15, 1990

INPUT ACTUAL ROUTE.
         DATE OF  PLACE OF              DATE OF  PLACE OF
        DEPARTURE DEPARTURE  TIME       ARRIVAL  ARRIVAL    TIME

FORWARD  11 11   SHINBASHI  13 30    11 11    OSAKA       17 30
ROUTE
BACKWARD 11 14   NAGOYA     11 14    11 14    SHINBASHI   08 45
ROUTE
TRANSPORTATION ADVANCE?
     <<< INPUT ALL NECESSARY ITEMS.>>>>
  CONTINUE?           <== E=END   N=NEXT   C = CONTINUE
```

FIG. 21

```
|-----------------------------------------------------------|
|   DOMESTIC BUSINESS TRIP                       90.11.15   |
|   EXPENSE LIQUIDATION INPUT                    14:12:40   |
|-----------------------------------------------------------|
                                                  PAGE 001

SELECT DESIRED ITEM.      1  <== 1 INPUT   3 CANCEL   4 ABROAD
DEPARTMENT NO.?  1234    FIRST SECTION OF SALES DEPARTMENT
PERSONAL ID NO.? 21177   TARO YAMADA

SPECIFY BUSINESS TRIP  1 <==   NO. OF EXPECTED  AMOUNT OF      ADVANCE PAYMENT
TO BE LIQUIDATED.              LIQUIDATION DATES ADVANCE PAYMENT REQUEST DATE
                               1 9 0  1 1  1 5       12,000     9 0 . 1 1   1 2
                               2 9 0  1 1  1 6       21,000     9 0 . 1 1   1 2

PURPOSE OF
LIQUIDATION?            1 LIQUIDATION       2 CANCELLATION
LIQUIDATION                                   OF BUSINESS TRIP
DUE DATE?     NOVEMBER 15, 1990.

SCHEDULE      FROM 1990 (YEAR),  11 (MONTH),  11 (DAY)
              TO   1990 (YEAR),  11 (MONTH),  14 (DAY)

INPUT ACTUAL ROUTE.
           DATE OF  PLACE OF           DATE OF  PLACE OF
           DEPARTURE DEPARTURE TIME    ARRIVAL  ARRIVAL   TIME

FORWARD
ROUTE     1 1  1 1  SHINBASHI 1 3 3 0  1 1 1 1  OSAKA     1 7 3 0

BACKWARD
ROUTE     1 1  1 4  NAGOYA    2 3 3 0  1 1 1 4  SHINBASHI 0 8 4 5

TRANSPORTATION ADVANCE?  014200     14,200
<<<PRESS EXECUTION KEY IF NO CHANGE IS MADE. >>>>
CONTINUE?         <== E=END  N=NEXT  C=CONTINUE
```

*FIG. 22*

```
 ---------------------------
| DOMESTIC BUSINESS TRIP    |                        90.11.15
| EXPENSE LIQUIDATION INPUT |                        14:13:03
 ---------------------------                         PAGE 001

SELECT DESIRED ITEM.       1  <==  1 INPUT   3 CANCEL   4 ABROAD
DEPARTMENT NO.?    1234         FIRST SECTION OF SALES
                                DEPARTMENT
PERSONAL ID NO.?   21177        TARO YAMADA
COUPON TICKET LEFT?        <==  1 NO    2 YES
WHICH COUPON TICKET?       <==  1:       2:       3:       4:
INPUT ACTUAL STAYS  DATE        DAY OF    TYPE OF WORKING/NONWORKING
                                THE WEEK  STAY    ON HOLIDAY
                    MMDD    (     )   (     )   (     )
                    MMDD    (     )   (     )   (     )
                    MMDD    (     )   (     )   (     )
                    MMDD    (     )   (     )   (     )

TYPE OF STAY              ==1  GENERAL STAY
                             2 STAY IN TRAIN, ETC.
                             3 UNDEMANDABLE STAY
WORKING/NONWORKING        ==1  TRAVEL TRANSFER ON HOLIDAY
ON HOLIDAY                   2 WORKING ON HOLIDAY
                             3 REST ON HOLIDAY
DEMAND FOR LUNCH?         <==1 LUNCH NONPAYABLE
                             2 LUNCH PAYABLE  (_____ DAYS)
                               HOTEL CHARGES  (_____ DAYS)
DAILY ALLOWANCE (_____ DAYS)
     (AMOUNT:             )          (AMOUNT:                )
TOTAL AMOUNT OF   AMOUNT OF ADVANCE       AMOUNT OF DEMANDABLE
EXPENSES         PAYMENT                  EXPENSE
   <<<INPUT ALL NECESSARY ITEMS.>>>
CONTINUE?                 <== E=END  N=NEXT  C=CONTINUE
```

FIG. 23

```
| DOMESTIC BUSINESS TRIP |                         90.11.15
| EXPENSE LIQUIDATION INPUT |                      14:13:28
                                                   PAGE 001

SELECT DESIRED ITEM.   1    <== 1 INPUT  3 CANCEL  4 ABROAD
DEPARTMENT NO.?  1 2 3 4         FIRST SECTION OF SALES
                                 DEPARTMENT
PERSONAL ID NO.?  2 1 1 7 7 7    TARO YAMADA
COUPON TICKET LEFT?              <== 1 NO  2 YES
WHICH COUPON TICKET?             <== 1:3387-52:3387-63:  4:
INPUT ACTUAL STAYS  DATE  DAY OF  TYPE OF WORKING/NONWORKING
                          THE WEEK  STAY    ON HOLIDAY
                   1 1 1 1  (SU)    1
                   1 1 1 2  (MO)    1
                   1 1 1 3  (TU)    2          2
                   MMDD  (   )

TYPE OF STAY          ==1 GENERAL STAY
                        2 STAY IN TRAIN, ETC.
                        3 UNDEMANDABLE STAY
WORKING/NONWORKING    ==1 TRAVEL TRANSFER ON HOLIDAY
ON HOLIDAY              2 WORKING ON HOLIDAY
                        3 REST ON HOLIDAY
DEMAND FOR LUNCH?     <==1 LUNCH NONPAYABLE
                        2 LUNCH PAYABLE  (  1  DAYS)
DAILY ALLOWANCE (___ DAYS)       HOTEL CHARGES (_____ DAYS )
         (AMOUNT:          )             (AMOUNT:         )
TOTAL AMOUNT OF   AMOUNT OF ADVANCE     AMOUNT OF DEMANDABLE
EXPENSES          PAYMENT               EXPENSE
      <<<< INPUT ALL NECESSARY ITEMS. >>>>
CONTINUE?          <== E=END  N=NEXT  C=CONTINUE
```

```
                                          90.11.15
                                          14:13:44
        ┌─────────────────────────┐       PAGE 001
        │ DOMESTIC BUSINESS TRIP  │
        │ EXPENSE LIQUIDATION INPUT│
        └─────────────────────────┘
SELECT DESIRED ITEM.       1 <== 1 INPUT  3 CANCEL  4 ABROAD
DEPARTMENT NO.?            1234 FIRST SECTION OF SALES DEPARTMENT
PERSONAL_ID NO.?           21177 TARO YAMADA
COUPON TICKET LEFT?        <==  1 NO   2 YES
WHICH COUPON TICKET?       <==  1:3387-52:3387-63:  4:
INPUT ACTUAL STAYS         DATE    DAY OF   TYPE OF WORKING/NONWORKING
                                   THE WEEK  STAY    ON HOLIDAY
                           1111    (SU)       1         2
                           1112    (MO)       1
                           1113    (TU)       2
                           MMDD

TYPE OF STAY             ==  1  GENERAL STAY
                             2  STAY IN TRAIN, ETC.
                             3  UNDEMANDABLE STAY

WORKING/NONWORKING       ==  1  TRAVEL TRANSFER ON HOLIDAY
ON HOLIDAY                   2  WORKING ON HOLIDAY
                             3  REST ON HOLIDAY

DEMAND FOR LUNCH?        <==  1  LUNCH NONPAYABLE
BACKWARD                      2  LUNCH PAYABLE ( 1 DAYS)
DAILY ALLOWANCE ( 3.5 DAYS)      HOTEL CHARGES ( 3 DAYS)
        (AMOUNT: 7,000)                  (AMOUNT: 27,000)
TOTAL AMOUNT OF      AMOUNT OF ADVANCE         AMOUNT OF DEMANDABLE
EXPENSES 48,000      PAYMENT 12,000            EXPENSE  36,000
       <<<< INPUT ALL NECESSARY ITEMS.>>>>
CONTINUE?             <==      E=END       N=NEXT      C=CONTINUE
```

```
 ----------------------------
|      APPROVAL INPUT         |                    90.12.06
|                             |                    11:33:06
 ----------------------------                      PAGE 001

SELECT DESIRED ITEM.    1  <==   1 APPROVAL INPUT  2 APPROVAL
                                 CHANGE  3 APPROVAL CHANGE
DEPARTMENT NO.?   1 2 3 4        SALES HEADQUARTER OF MAIN
                                 OFFICE
APPROVAL PERSON-IN-CHARGE
ID NO.?           4 2 6 8 7      SHOICHI SUZUKI
◆◆ DATA REQUIRED TO BE APPROVED ARE AS FOLLOWS.◆◆◆
◆
     NO.  INPUT    MANAGEMENT NO.    HANDLER
          DATE 01
     02
     03
     04
     05
     06
     07
     08
     09
     10

NUMBERS CORRESPONDING TO    <==   IF CONSECUTIVE NUMBERS ARE TO
CONTENTS TO BE CHECKED?           BE APPROVED, INPUT "1".
                                  IF EACH NUMBER IS TO BE INDE
                                  -PENDENTLY APPROVED,INPUT "NO"

CONTINUE?           <==   E=END  N=NEXT  C=CONTINUE
```

```
                                          90.12.06
                                          11:33:20
                    APPROVAL INPUT         PAGE 001

SELECT DESIRED ITEM.
                    1 <== 1 APPROVAL INPUT  2 APPROVAL
                          CHANGE  3 APPROVAL CHANGE
DEPARTMENT NO.?     1234  SALES HEADQUARTER OF MAIN
                          OFFICE
APPROVAL PERSON-IN-CHARGE
ID NO.?             42687  SHOICHI SUZUKI
◇◇◇ DATA REQUIRED TO BE APPROVED ARE AS FOLLOWS. ◇◇◇
      INPUT
NO.   DATE        MANAGEMENT NO.    HANDLER
01   90 12 01     2311011250        SACHIKO HASHIMOTO
02   90 12 01     1711005960        EMI NAKAYAMA
03   90 12 01     1711005970        EMI NAKAYAMA
04   90 12 01     1711005980        EMI NAKAYAMA
05   90 12 02     1711006070        EMI NAKAYAMA
06   90 12 02     1711006080        EMI NAKAYAMA
07   90 12 02     1711006090        EMI NAKAYAMA
08   90 12 01     6811029600        HIROSHI KIMURA
09   90 12 01     6811030640        HIROSHI KIMURA
10   90 12 01     6811030660        HIROSHI KIMURA
                      <==
NUMBERS CORRESPONDING TO    IF CONSECUTIVE NUMBERS ARE TO
CONTENTS TO BE CHECKED?     BE APPROVED, INPUT "1".
                      <==   IF EACH NUMBER IS TO BE INDEPENDENTLY
                            APPROVED, INPUT "NO".
CONTINUE?                   E=END   N=NEXT   C=CONTINUE
```

FIG.27

```
                                              90.12.06
                                              11:33:32
                                              PAGE 001
            ┌─────────────────────┐
            │    APPROVAL INPUT   │
            └─────────────────────┘
SELECT DESIRED ITEM.   1 <==  1 APPROVAL INPUT  2 APPROVAL
                              CHANGE  3 APPROVAL CHANGE
DEPARTMENT NO.?        2345   SALES DEPARTMENT
APPROVAL PERSON-IN-CHARGE     SHOICHI SUZUKI
ID NO.?
◇◇◇ DETAILS OF DATA ARE AS FOLLOWS. ◇◇◇
DATE OF EVENT REQUIRING
APPROVAL
DATE OF INPUT

HANDLER                       SACHIKO HASHIMOTO

MANAGEMENT NO.

EXPLANATION                   ASSOCIATED WITH COMPANY
                              AUTOMOBILE
CONTENT                       REPAIRING EXPENSE FOR COMPANY
                              AUTOMOBILE NO. 6
ACCOUNT TITLE (L)             VEHICLE MANAGEMENT EXPENSES

ACCOUNT TITLE (R)             DOMESTIC SERVICE EXPENSES

APPROVED?    Y <==   Y=OK    N=NG       H=PENDING
CONTINUE?      <==   E=END   N=NEXT     C=CONTINUE
                     S=STOP
```

FIG.28

APPROVAL/SETTLEMENT PROCESSING OF RECEIPT

FIG. 30

```
                    ┌─────────────────┐         90.12.07
                    │ CASH LIQUIDATION│         15:13:19
                    └─────────────────┘         PAGE 001

SELECT DESIRED ITEM.
DEPARTMENT NO. ?   1 2 3 4      <==    1 INPUT    3 CANCEL
                                       FIRST SECTION OF SALES
                                       DEPARTMENT
INPUT PERSON-IN-CHARGE                 TARO YAMADA
ID NO. ?
ADVANCE PERSON-IN-CHARGE               TARO YAMADA
ID NO. ?
CASH DEPOSIT/WITHDRAWAL?        <==    1 CASH DEPOSIT
                                       2 CASH WITHDRAWAL
DATE OF CASH LIQUIDATION?              DECEMBER 7, 1990
CASH DEPOSIT/WITHDRAWAL                KANDA SHOTEN
DESTINATION?
EXPLANATION CODE?
CONTENT CODE?
AMOUNT?
ACCOUNT TITLE    ==

<<< INPUT ALL NECESSARY ITEMS. >>>
CONTINUE?           <==   E = END   N = NEXT   C = CONTINUE
```

FIG. 31

```
┌─────────────────────┐                              90.11.15
│  CASH LIQUIDATION   │                              15:13:35
└─────────────────────┘                              PAGE 001

SELECT DESIRED ITEM.
DEPARTMENT NO.?        1234        <==  1 INPUT    3 CANCEL
                                        FIRST SECTION OF SALES
                                        DEPARTMENT
INPUT PERSON-IN-CHARGE                  TARO YAMADA
ID NO.?                21177
ADVANCE PERSON-IN-CHARGE                TARO YAMADA
ID NO.?                21177
CASH DEPOSIT/WITHDRAWAL?1          <==  1 CASH DEPOSIT
                                        2 CASH WITHDRAWAL
DATE OF CASH LIQUIDATION?               DECEMBER 7, 1990
CASH DEPOSIT/WITHDRAWAL                 KANDA SHOTEN
DESTINATION?
EXPLANATION CODE?
CONTENT CODE?
AMOUNT?
ACCOUNT TITLE  ===  LIST OF DETAILS CODES  ===
◆ 001 DOMESTIC BUSINESS    ◆ 002 OVERSEAS         ◆ 003 CUSTOMER ENTERTAIN
      TRIPS                      BUSINESS TRIPS        -MENT EXPENSES
◆ 004 CONFERENCE           ◆ 010 EXPENSES OF      ◆ 011 EXPENDABLE EXPENSES
      EXPENSES                   BOOKS AND
                                 MAGAZINES
       <<<  INPUT ALL NECESSARY ITEMS. >>>
           CONTINUE?         <==  E = END   N = NEXT   C = CONTINUE
```

```
                                              90.12.07
                                              15:13:19
                                              PAGE 001

CASH LIQUIDATION

SELECT DESIRED ITEM.
DEPARTMENT NO.?         1234       1 <== 1 INPUT  3 CANCEL
                                         FIRST SECTION OF SALES
                                         DEPARTMENT
INPUT PERSON-IN-CHARGE                   TARO YAMADA
ID NO.?                 21177
ADVANCE PERSON-IN-CHARGE                 TARO YAMADA
ID NO.?                 21177
CASH DEPOSIT/WITHDRAWL?            <== 1 CASH DEPOSIT
                                       2 CASH WITHDRAWL
DATE OF CASH LIQUIDATION?              DECEMBER 7, 1990
CASH DEPOSIT/WITHDRAWL                 KANDA SHOTEN
DESTINATION?
EXPLANATION CODE?       010            EXPENSES OF BOOKS AND
CONTENT CODE?           001                     MAGAZINES
AMOUNT?
ACCOUNT TITLE   ===                 ===
  ◊ LIST OF CONTENT CODES ◊◊◊
001 EXPENSES OF BOOKS  002 NEWSPAPER EXPENSES  003 MAP EXPENSES
    AND MAGAZINES
004 OFFICIAL GAZETTE   005 TECHNICAL REFERENCE
    EXPENSES              EXPENSES
       <<<< INPUT ALL NECESSARY ITEMS. >>>>
 CONTINUE?                  <==  E=END      N=NEXT      C=CONTINUE
```

FIG.32

```
                              CASH LIQUIDATION                    90.12.07
                                                                  15:14:23
                                                                  PAGE 001

SELECT DESIRED ITEM.           1    <==  1 INPUT    3 CANCEL
DEPARTMENT NO. ?        1 2 3 4          FIRST SECTION OF SALES
                                         DEPARTMENT
INPUT PERSON-IN-CHARGE                   TARO YAMADA
ID NO. ?          2 1 1 7 7
ADVANCE PERSON-IN-CHARGE                 TARO YAMADA
ID NO. ?          2 1 1 7 7
CASH DEPOSIT/WITHDRAWAL? 1     <==  1 CASH DEPOSIT
                                    2 CASH WITHDRAWAL
DATE OF CASH LIQUIDATION?           DECEMBER 7, 1990
CASH DEPOSIT/WITHDRAWAL             KANDA SHOTEN
DESTINATION?
EXPLANATION CODE?       010              EXPENSES OF BOOKS AND
                                         MAGAZINES, ETC.
CONTENT CODE?           001              EXPENSES OF BOOKS AND
                                         MAGAZINES
AMOUNT?               15000              ¥ 15,000
ACCOUNT TITLE   ===  010 001   ===       BOOK EXPENSES

EXPENSE PLANNING NO. ? 000
CONSUMPTION TAX                <==  1 DEPOSIT      2 WITHDRAWAL
CLASSIFICATION?                     3 EXPORT TAX EXEMPTION   4 ITEMS
                                      REQUIRING NO CONSUMPTION TAX.   >>>>

<<<< INPUT ALL NECESSARY ITEMS. >>>>
              CONTINUE?
```

```
┌─────────────────┐                          90.12.07
│ CASH LIQUIDATION │                          15:14:42
└─────────────────┘                          PAGE 001

SELECT DESIRED ITEM.      1        <==   1 INPUT    3 CANCEL
DEPARTMENT NO. ?   1 2 3 4               FIRST SECTION OF SALES
                                         DEPARTMENT
INPUT PERSON-IN-CHARGE 2 1 1 7 7         TARO YAMADA
ID NO. ?          2 1 1 7 7
ADVANCE PERSON-IN-CHARGE
ID NO. ?          2 1 1 7 7              TARO YAMADA
CASH DEPOSIT/WITHDRAWAL?1        <==   1 DEPOSIT
                                         2 WITHDRAWAL
DATE OF CASH LIQUIDATION?                DECEMBER 7, 1990
CASH DEPOSIT/WITHDRAWAL                  KANDA SHOTEN
DESTINATION?
EXPLANATION CODE?         010            EXPENSES OF BOOKS AND
                                         MAGAZINES, ETC.
CONTENT CODE?             001            EXPENSES OF BOOKS AND
                                         MAGAZINES
AMOUNT?                 15000            ¥ 15,000
ACCOUNT TITLE   === 010 001    ===       BOOK EXPENSES

EXPENSE PLANNING NO. ? 000               DEPARTMENT OPERATING EXPENSES
CONSUMPTION TAX           1        <==   1 TAXED    2 NONTAXED
CLASSIFICATION?

<<< PRESS EXECUTION KEY IF NO CHANGE IS MADE. >>>
    CONTINUE?
```

PAPERLESS ACCOUNTING SYSTEM

This application is a continuation of application Ser. No. 07/690,852 filed on Apr. 24, 1991, now abandoned.

BACKGROUND OF THE INVENTION

1. Field of the Invention

The present invention relates to an accounting system using an electronic slip.

2. Related Background Art

Conventional paperless accounting systems include a system for receiving slip data from a terminal installed in each department and issuing an electronic slip instead of a paper slip in a sales or personnel department whose person in charge has a business trip or a reception with a customer. This terminal is on-line connected to a computer in a computer department, and collective management of the electronic slips is performed. In a settlement department, the contents of the electronic slips collected in the computer are checked and settled.

Persons in charge who have poor accounting knowledge in the sales and personnel departments directly input accounting data in computers installed in the respective departments to form slips of a paperless accounting system. For this reason, erroneous accounting data caused by human mistakes by the persons in charge are often input to the computers. In addition, the number of input operations is increased because these persons are not accustomed to the accounting operations.

In the above conventional electronic system, receipts disbursements processing of liquidation of business trip expenses is performed in cash by a receipts disbursements person in charge. For this reason, operational burdens are overloaded and metal coins must be handled and a possibility of cash handling errors is large. In addition, cash must be packed in paper envelopes depending on types of payments, thus requiring a large number of cumbersome operational procedures.

Further, even if a post number and a slip code are erroneously input in processing for issuing slip data from each terminal in sales and personnel departments in the conventional system. almost all the input data are registered as they are. In addition, since a formed slip is checked on the screen, it is difficult to find input errors. For this reason, an erroneous electronic slip is often issued, resulting in inconvenience.

Further, some slips require attachment of receipts. Receipts can be attached to paper slips, but electronic slips are not suitable for handling of receipts. A conventional paperless accounting system uses electronic slips which do not physically exist and it is difficult to deal with a correspondence between a receipt and an electronic slip. For this reason, a necessary receipt is not found at the time of settlement of a corresponding electronic slip in the settlement department, thus failing the settlement.

Further, in the above conventional paperless accounting system, a slip issued in each department such as sales and personnel department must be settled in a settlement department by a manager of each department in which the slip is issued. In this case, the slips are transferred to the respective managers for approval-settlement in different transfer routes. Therefore, transfer errors often occur, thus posing problems.

Further a large-capacity file server is arranged in a computer in a general computer department. Electronic slips collected from the respective departments are managed by this file server. The electronic slips stored in the file server are backed up by a magnetic tape every predetermined period. This backup operation requires a long period of time because all the files stored in the file server are manually operated. Therefore, the backup operation cannot be frequently performed and can be performed a maximum of once a week. For this reason, when the system-down state occurs and all the electronic slip data stored in the file server are lost, a maximum of seven-day electronic slip data cannot be restored, resulting in inconvenience.

Further, in a conventional paperless accounting system, processing from issuance of an electronic slip to approval-settlement processing is performed from a terminal installed in each department. This is also very convenient to a user. However, a counterfeit slip may be issued by an unauthorized person, and an issued slip may be arbitrarily approved and settled.

SUMMARY OF THE INVENTION

An object of the present invention is to provide a paperless accounting system capable of accurately forming slips at high speed.

A further object of the present invention is to provide a paperless accounting system capable of reducing handling of metal coins and corresponding operational burdens and cash receipts disbursements operations.

A further additional object of the present invention is to provide a paperless accounting system capable of issuing a correct electronic slip.

A still further object of the present invention is to provide a paperless accounting system capable of properly settling an electronic slip requiring a receipt at high speed.

A still further object of the present invention is to provide a paperless accounting system capable of properly performing approval settlement processing at high speed.

An additional further object of the present invention is to provide a paperless accounting system capable of preventing loss of the electronic slips even upon occurrence of a system down state.

A further object of the present invention is to provide a highly confidential paperless accounting system.

A paperless accounting system of the present invention includes an input unit, having an input monitor function of monitoring whether values as slip data are input to all necessary input items, for displaying menu screens having different input items in units of slip types, a checker for checking validity of the data input by the input unit, and an assigner for assigning a slip number to correct slip data checked by the checker.

In order to solve the above problems, there is provided a paperless accounting system including an electronic slip forming unit for forming an electronic slip and storing electronic slip data in a first electronic slip storing unit, an additional processor for additionally processing the electronic slip data stored in the first electronic slip storing unit, a processing manager for managing an electronic slip processing state in the electronic slip forming unit and the additional processor, a receipts disbursements slip extracter means for copying and processing selected data subjected to receipts disbursements processing and selected from the electronic slips stored in the first electronic slip storing unit and for storing a copied electronic slip in a second electronic slip storing unit, and a transaction manager for managing a transaction with a banking organ on the basis of the electronic slip stored in the second electronic slip storing unit.

In order to solve the above conventional problems described above, according to a first embodiment of the invention, there is provided a paperless accounting system including an electronic slip forming unit for forming an electronic slip and storing electronic slip data in an electronic slip storing unit, an additional processer for performing additional processing of the electronic slip data stored in the electronic slip storing unit, a processing manager for managing an electronic slip processing state in the electronic slip forming unit and the additional processer and an electronic slip access unit for accessing an electronic slip stored in the electronic slip storing unit in accordance with an index as a combination of a plurality of key items of the electronic slip.

According to a second embodiment of the present invention, there is provided a paperless accounting system including a electronic slip forming unit for forming an electronic slip and storing electronic slip data in an electronic slip storing unit, an additional processer for performing additional processing of the electronic slip data stored in the electronic slip storing unit, a master table unit arranged in the host processing apparatus, and a master data determining unit for causing the electronic slip forming unit or the additional processer to determine matching of the electronic slip with basic data registered in the master table unit.

In order to solve the above problems, according to the present invention, there is provided a paperless accounting system including an electronic slip forming unit for forming an electronic slip and storing electronic slip data in an electronic slip storing unit, an adhesion card issuing unit for determining an electronic slip requiring a receipt from electronic slips formed by the electronic slip forming unit and for issuing a receipt adhesion card corresponding to the electronic slip requiring the receipt, an additional processer for performing additional processing of the electronic slip data stored in the electronic slip storing unit, and a manager for managing an electronic slip processing state in the electronic slip forming unit and the additional processer.

In order to solve the above problems, there is provided a paperless accounting system including an electronic slip forming unit for forming an electronic slip and storing electronic slip data in an electronic slip storing unit, an additional processer for performing additional processing of the electronic slip data stored in the electronic slip storing unit, and a manager for managing an electronic slip processing state in the electronic slip forming unit and the additional processer.

In order to solve the conventional problems described above, according to the present invention, there is provided a paperless accounting system including an electronic slip forming unit for forming an electronic slip and storing electronic slip data in an electronic slip storing unit, an additional processer for performing additional processing of the electronic slip data stored in the electronic slip storing unit, a processing manager for managing an electronic slip processing state in the electronic slip forming unit and the additional processer, a transfer unit for transferring, to the database unit at a predetermined rate, only electronic slips of a predetermined processing state selected from electronic slips stored in the electronic slip storing unit.

In order to solve the above problems, according to the present invention, there is provided a paperless accounting system including an electronic slip forming forming unit for forming an electronic slip and storing electronic slip data in an electronic slip storing unit, an additional processer for performing additional processing of the electronic slip data stored in the electronic slip storing unit, and a processing manager for managing an electronic slip processing state in the electronic slip forming unit and the additional processer, the additional processer having a user limiting function.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

The present invention will becomes more fully understood from the detailed description given hereinbelow and the accompanying drawings which are given by way of illustration only, and thus, are not limitative of the present invention and wherein:

FIG. 2 is a view showing a record structure of an electronic slip record;

FIG. 4 is a view showing a structure of a superdescriptor;

FIG. 5 is a view showing a structure of another superdescriptor;

FIG. 6 is a view showing a structure of still another superdescriptor;

FIG. 7 is a view showing a structure of still another superdescriptor;

FIG. 8 is a view showing a structure of still another superdescriptor;

FIG. 9 is a view showing a structure of a superdescriptor in a processing form;

FIG. 11 is a view showing management by the status information;

FIG. 13 is a view showing a screen content in input processing of this embodiment;

FIG. 14 is a view showing a screen content in the input processing of this embodiment;

FIG. 15 is a view showing a screen content in the input processing of this embodiment;

FIG. 16 is a view showing a screen content in the input processing of this embodiment;

FIG. 17 is a view showing a screen content in the input processing of this embodiment;

FIG. 18 is a view showing a screen content in the input processing of this embodiment;

FIG. 19 is a view showing a screen content in the input processing of this embodiment;

FIG. 20 is a view showing a screen content in the input processing of this embodiment;

FIG. 21 is a view showing a screen content in the input processing of this embodiment;

FIG. 22 is a view showing a screen content in the input processing of this embodiment;

FIG. 23 is a view showing a screen content in the input processing of this embodiment;

FIG. 24 is a view showing a screen content in the input processing of this embodiment;

FIG. 26 is a view showing a screen content of approval processing of this embodiment;

FIG. 27 is a view showing a screen content of the approval processing of this embodiment;

FIG. 28 is a view showing a screen content of the approval processing of this embodiment;

FIG. 30 is a view showing a screen content in slip formation processing of this embodiment;

FIG. 31 is a view showing a screen content in the slip formation processing of this embodiment;

FIG. 32 is a view showing a screen content in the slip formation processing of this embodiment;

FIG. 34 is a view showing a screen content in the slip formation processing;

FIG. 35 is a view showing a screen content in the slip formation processing;

DESCRIPTION OF THE PREFERRED EMBODIMENT (1) Arrangement of Embodiment

Figure 1:
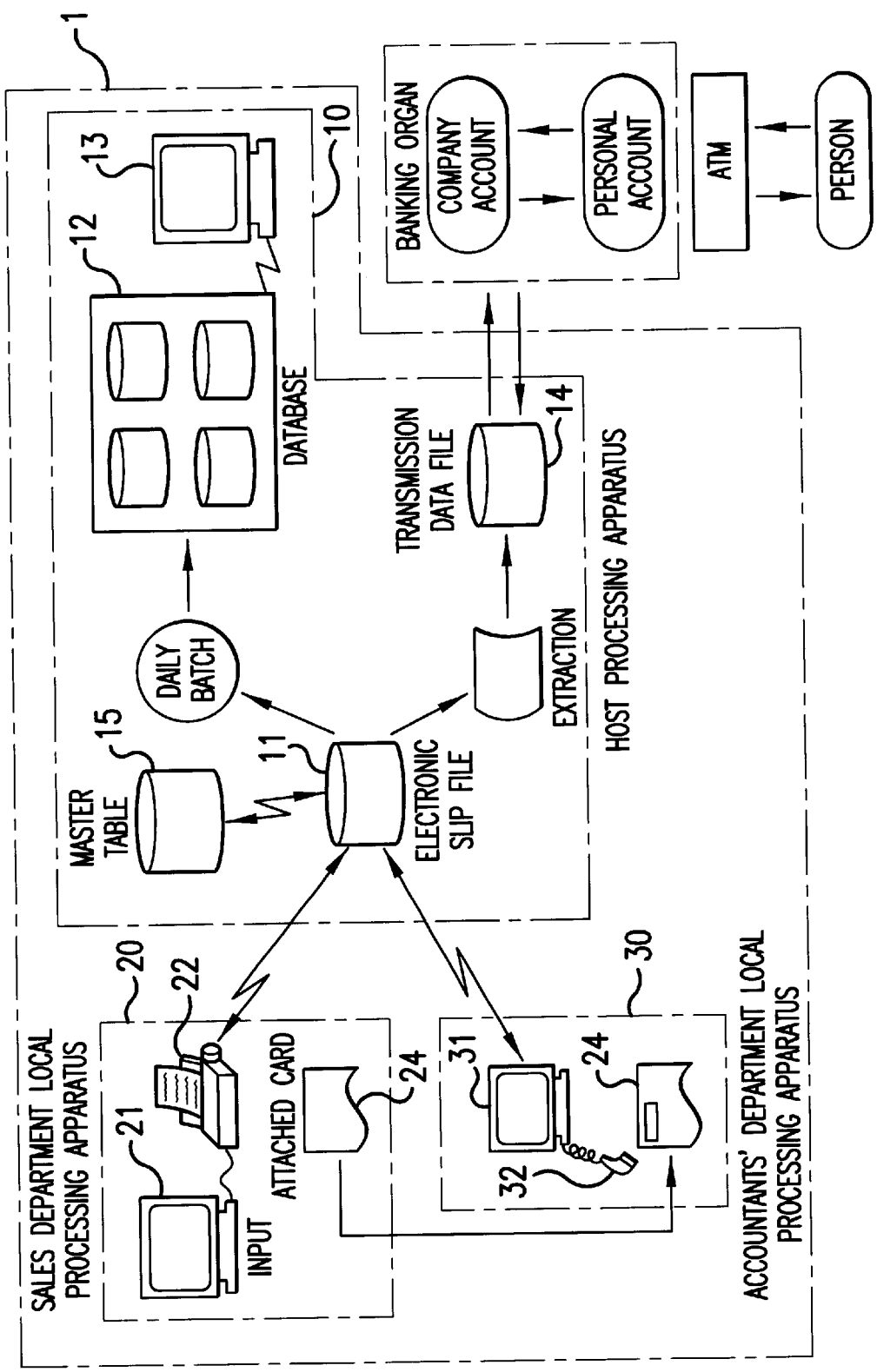
FIG. 1 is a block diagram showing a paperless accounting system according to an embodiment of the present invention.

A paperless accounting system according to an embodiment of the present invention will be described with reference to FIGS. 1 to 39. FIG. 1 is a block diagram of the paperless accounting system of this embodiment. A paperless accounting system 1 of this embodiment comprises a host processing apparatus 10, and local processing apparatuses 20 and 30 connected to the host processing apparatus 10. The host processing apparatus 10 installed in a computer department comprises a disk unit 11 for storing electronic slip records, a database unit 12 for storing a database of a few days, a collating monitor unit 13, a transmission data storage unit 14 for storing transaction data with a banking organ, and a master table 15 for prestoring data for input and examination operations. A CPU (not shown) accesses an electronic slip record stored in the disk unit 11 to perform processing of this embodiment. The local processing apparatus 20 installed in the sales department includes a terminal unit 21 serving as an input means connected to the disk unit 11 in the host processing apparatus 10 through a communication line, and a printer unit 22 for forming an attached card 24. The local processing apparatus 30 installed in the personnel department includes a terminal unit 31 connected to the disk unit 11 in the host processing apparatus 10 through a communication line, and an image scanner 32 for reading a slip number of the attached card 24.

(2) General Description of Processing of Embodiment

Processing of this embodiment will be generally described below. A person in charge of the sales department inputs slip data from the terminal unit 21. In this input operation, input slip data is compared with data prestored in the master table 15 to verify matching between the input data and the prestored data. An electronic slip record is formed by this input operation and is stored in the disk unit 11. The manager of the sales department checks an electronic slip record which requires approval at the terminal unit 21 and inputs approval data of the electronic slip record which can be approved. In the accountants' department, the electronic slip record which has been approved by the manager of the sales department is checked at the terminal unit 31 and final settlement of the slip is performed. The attached card 24 for a slip which is required to attach a receipt for settlement is formed at the printer unit 22, so that the receipt is attached to the upper surface of the card 24. When an attached card 24 which requires the signature of the manager is to be formed, the slip number is read by the image scanner 32, and a settlement input is made while the record of the disk unit 11 is collated. The electronic slip records stored in the disk unit 11 are registered in the database 12 by a daily batch processing operation. Of all the settled records, electronic slip records which require bank transfer operations are copied, and the copied data are stored in the disk unit 14. In this manner, the copied electronic slip records are transmitted from the disk unit 14 to a banking organ. Transfer to accounts or the like is performed in accordance with this transmitted electronic slip record.

(3) Detailed Description of Processing of Embodiment

An embodiment of the present invention will be described in detail below.

(3.1) Electronic Slip Record (3.1.1) Structure of Electronic Slip Record

A structure of an electronic slip record used in this embodiment will be described with reference to FIG. 2. The electronic slip record comprises a key item, a slip issuance department information item, a slip history information item, and an application information item. The application information item is classified into a slip common information item and a journal information item. The key item is a keyword item for slip retrieval and includes an electronic slip data management No., an accounting date, and a slip issuer post No. The slip issuance department information item includes a branch office code, a department code, and a slip issuer post No. The slip history information item includes settlement place classification, a settlement route count, and a history information count. The slip common information item is an item of information accompanying a slip and includes an attached card O/P classification, an accounting date, and a transfer No. The journal information item is an item of information accompanying each credit/debit side account title, credit/debit side classification, an explanation, and account title code.

(3.1.2) Access Processing of Electronic Slip Record

Figure 3:
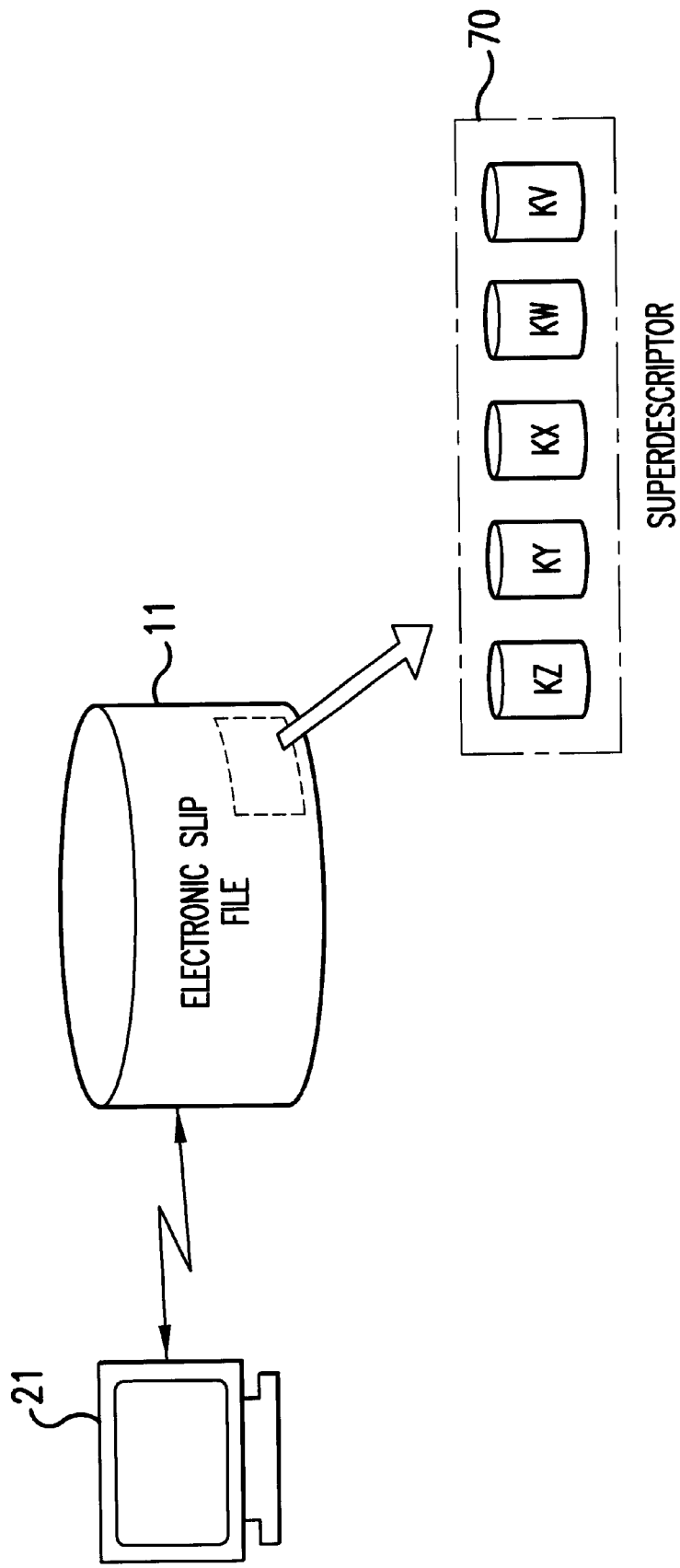
FIG. 3 is a view showing slip management by superdescriptors.

Access processing of electronic slip records will be described below. An electronic slip record formed by input processing is stored in the disk unit 11 until it is registered in the database 12 by batch processing. The electronic slip record stored in the disk unit 11 as described above is frequently accessed for approval-settlement processing. In this embodiment, in order to increase the speed of this access processing, a superdescriptor serving as a retrieval index is used to manage all the electronic slip records stored in the disk unit 11. The principle of management by the superdescriptor is shown in FIG. 3. In this embodiment, the electronic slip records are managed by five superdescriptors, i.e., KZ, KY, KX, KW, and KV. When a new electronic slip record is formed, the corresponding retrieval data is added to a superdescriptor. This addition processing is performed in real time. At the same time, sorting processing is performed. A hard index of an electronic slip record is also included in each retrieval data of the superdescriptor. With reference to this index, each electronic slip record can be retrieved from the superdescriptors at high speed.

Structures of these superdescriptors are shown in FIGS. 4 to 8, respectively. The indices of the electronic slip records are omitted from FIGS. 4 to 8 for illustrative convenience. FIG. 4 is a view showing the structure of the superdescriptor KZ. The superdescriptor KZ is a record registration retrieval index. This retrieval index is used to add, update, and erase data with respect to the electronic slip records. FIG. 5 is a view showing the structure of the superdescriptor KY. The superdescriptor KY is an index for retrieving target data in an approval settlement (without any attached card) input operation. A person in charge for performing approval settlement processing can retrieve target data in units of slip IDs. Note that an approval settlement input operation is performed only when a screen input operator post No. is registered in the settlement route table. In order to update the retrieval data upon completion of the approval-settlement input operation, the superdescriptor KZ is used. FIG. 6 is a view showing the structure of the superdescriptor KX. The superdescriptor KX is a retrieval index used for retrieving general ledger information in units of account titles. Corresponding data is retrieved by an account title summary. The next slip record is retrieved, an amount of corresponding account title is added or subtracted to or from the slip of the settler, and the resultant amount is displayed. FIG. 7 is a view showing the structure of the superdescriptor KW. The superdescriptor KW is an index for retrieving an issued electronic slip record. This retrieval index is an index for retrieving a slip issued by a department to which an issuer belongs, instead of preparing slip copies in each department. When an electronic slip management number is unknown, this retrieval index is used to perform retrieval. FIG. 8 is a view showing the structure of the superdescriptor KV. The superdescriptor KV is an index for retrieving nonregistered data. This superdescriptor is mainly used in the accounting section and the product section. Practical applications of the above superdescriptors are listed in FIG. 9. As can be apparent from FIG. 9, all the retrieval processing at the time of issuance of a slip is performed by using the superdescriptor KZ. Other superdescriptors are used in approval settlement processing and retrieval data output processing.

In this embodiment, the number of superdescriptors and the structures of the respective superdescriptors are adjusted to achieve the highest retrieval efficiency. When the number of superdescriptors is 4 or less, or 6 or more, or when the structure of each superdescriptor is changed, the retrieval efficiency is lower than that using the five superdescriptors.

(3.1.3) Management of Electronic Slip Record

Figure 10:
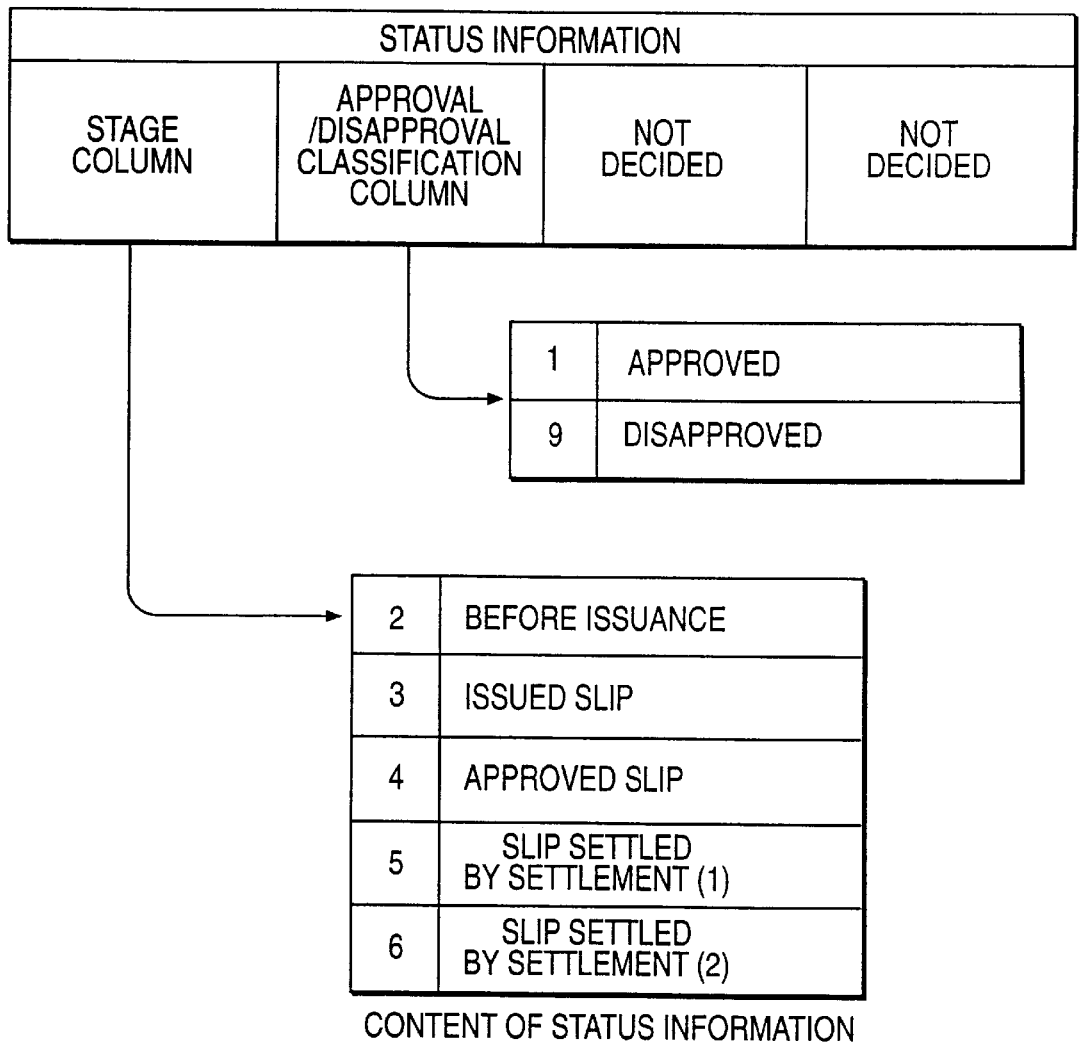
FIG. 10 is a view showing the content of status information.

Management of electronic slip records will be described below. Management of the electronic slip records is performed by status information stored in a desired area of each electronic slip record. The content of the status information is shown in FIG. 10. The status information has four segmented data areas. Of these segmented data areas, a stage column stores a stage of processing of an electronic slip record. An approval/disapproval classification column stores data representing whether a slip is approved or not approved. Changes in status information by each stage processing are shown in FIG. 11. Changes in status information in approval processing are taken as an example. Status information of an electronic slip record which is not yet approved exhibits "3100". When an approvable state (approval) input is made, the status information is changed to "4100". When a disapproval input is made, the status information is changed to "2900". When an error is detected in the approval input and approval cancellation is input, the status information is changed from "4100" to "2900". However, when an error is detected in a disapproval input and disapproval cancellation is input, the status information is changed from "2900" to "4100". The status information is similarly changed in other stages. A processing level or stage of each electronic slip record can be grasped by this status information. Since processing route information which describes a processing route of each electronic slip record is stored in the master table 15, each electronic slip record can be systematically managed by using the status information and the processing route information.

(3.2) Input Processing

Figure 12:
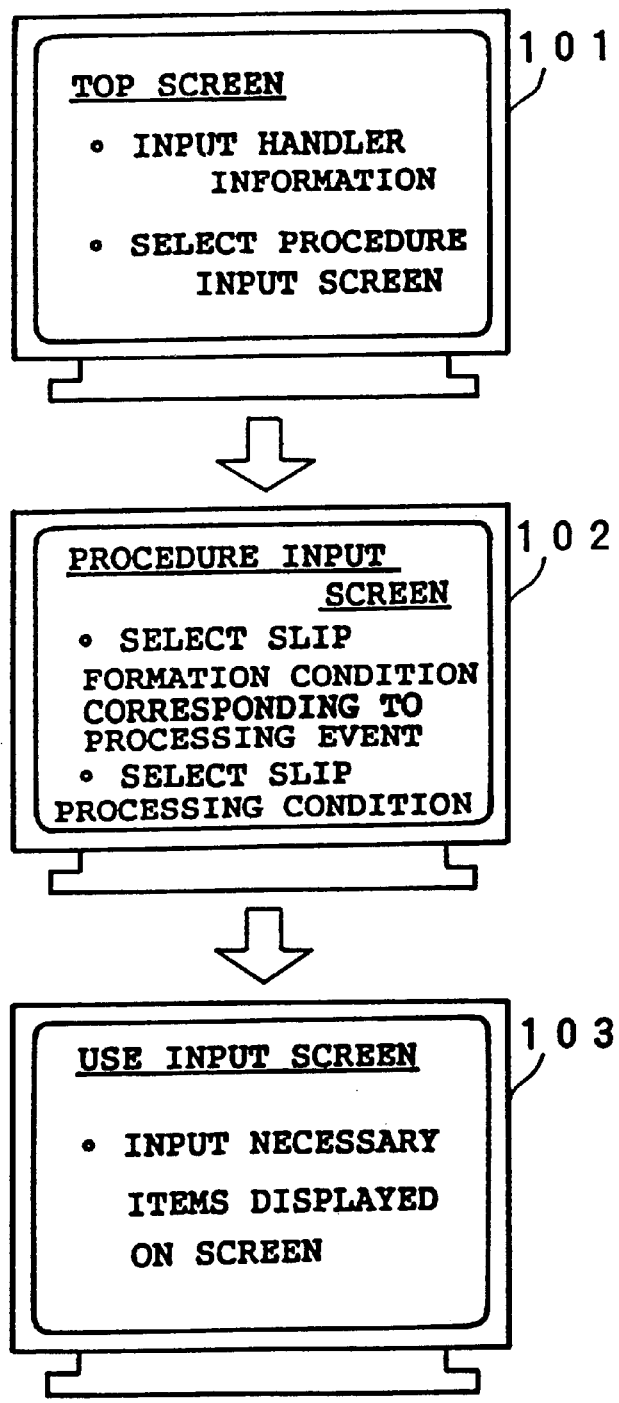
FIG. 12 is a view showing input processing of this embodiment.

Input processing will be described with reference to FIGS. 12 to 24. FIG. 12 is a view showing the general principle of input processing. When the terminal unit 21 is powered on, a top screen 101 is displayed. A handler or person-in-charge information input and selection of a procedure input screen can be performed on the top screen 101. The handler information includes a branch office code, a department number, and a personal ID number. When handler information is input, the number of times of the master reference on each input screen can be reduced. As for the branch office code, the branch office in which the terminal unit 21 is installed is determined, and the branch office code can be automatically set. The procedure input screen includes a slip formation screen, an approval screen, and a collation screen, so that the operator can selectively input data in the form of a menu. When the slip formation screen is selected, a procedure input screen 102 for slip formation is displayed. On this procedure input screen 102, a necessary slip can be selected from slip menus classified in accordance with transaction contents. By this selection processing, types of slips to be formed can be determined. By this determination of the type of slip, an item input screen 103 corresponding to this type of slip is displayed. Necessary item data are input as slip data in accordance with the prompts displayed on this item input screen 103.

Domestic business trip request input operations are shown in FIGS. 13 to 16, and domestic business trip liquidation input operations are shown in FIGS. 17 to 24 as detailed examples as the item input screen 103.

The domestic business trip request input operations will be described first. A desired item as processing classification, a department number, a personal ID number, the date of request, and the date of business trip are input (FIG. 13). When an item except for items 1, 3, and 4 is input in processing classification, an error occurs. The department number and the personal ID number are compared with data registered in the master table 15. If the input data are correct, the following input processing is performed. The presence/absence of the request for a hotel charge and use/nonuse of a coupon ticket are input (FIG. 14). As for the request for a hotel charge, as item 1 (demandable hotel charge) is usually selected, item 1 is highlighted beforehand. If the item 1 (demandable hotel charge) is to be selected, input of "1" can be omitted. A key input is required only if item 2 (undemandable hotel charge) is to be selected. There are two types of coupon tickets, i.e., plane and bullet train coupon tickets. When a key input is made to indicate use of a coupon ticket, a screen for inputting detailed data is displayed (FIG.

15). Two input columns are available to input use of the coupon tickets, so that use of two types of coupon tickets can be demanded. Input items are a type of transportation for coupon tickets, one-way ticket/round ticket, and a destination. The presence/absence of a roughly estimated transportation expense required in addition to use of a coupon ticket, and the presence/absence of advance payments are input (FIG. 16). The roughly estimated transportation expense is input in units of ¥1,000. If advance payments are not required, item 1 is input in the advance payments column. If the advance payments are required, a blank is input in this column. Any other input causes an error. The advance payments include a daily allowance, a hotel charge, and a roughly estimated transportation expense. When all the items are input, letter "E" is input. By this input, the domestic business trip request input processing is completed.

The domestic business trip liquidation input operations will be described below. A desired item in processing classification, a department number, and a personal ID number are input (FIG. 17). By these input operations, an expected liquidation date, an amount of advance payments, and an advance payment request date of a nonliquidated business trip slip are displayed (FIG. 18). These displayed data have been input in the domestic business trip request input operations, so that its electronic slip record has been registered. A request slip number subjected to liquidation is selected from this display and is input. A maximum number of liquidation cases to be displayed is 2. In addition, since a maximum of eight nonliquidated slips can be registered, one of numbers 1 to 8 can be selected. In order to liquidate a slip which has not yet been requested, item 9 is selected. The purpose of liquidation and the date of liquidation are input (FIG. 19). The purpose of liquidation includes a liquidation after a business trip and a liquidation by business trip cancellation. Since the schedule of a business trip is automatically displayed, a change in schedule of the business trip can be made. When the date of departure, the date of arrival, and the date of liquidation are not arranged with a lapse of time, an error occurs. As actual route data, the date of departure, and the departure station, the date of arrival, and the arrival station are input, and a maximum of six digits are input as a transportation advance (FIG. 20). When all the items are input, an execution key is depressed (FIG. 21). By this key input operation, a final check of the input contents of the items is performed by using the data registered in the master table 15. If no problem occurs, a new screen is displayed (FIG. 22). An input representing whether the coupon tickets are left is made (FIG. 23). If item 2 (YES) is input, a list of numbers of coupon tickets actually handed to the operator is displayed. Numbers of coupon tickets left are input with reference to the list. Dates except for the date of return in the business trip schedule are displayed, so that the "Type of Stay" and "Working/Nonworking on Holiday" are input. Any input except for items 1 to 3 causes an input error in these classification items. An item "Lunch Nonpayable" or "Lunch Payable" during the business trip is input. If a personnel cafeteria is used during the business trip, item 1 (Lunch Nonpayable) is input. When all the above input operations are completed, the number of days of daily allowance, the amount of daily allowance, a hotel charge, an amount of expense to be liquidated, advance payments, and an amount of liquidation are displayed (FIG. 24). If these amounts are correct, letter "E"is input, thereby completing the domestic business trip liquidation input operations.

The input processing has three functions, i.e., an input monitor function, an automatic setup function, and an account title setup function. The input monitor function is a function of monitoring that all the items are input. The input monitor function includes an input comparison function and an input prompting function. The input comparison function is a function of comparing an already input item with a necessary input item to check noninput items. In order to execute this function, necessary input item data to be compared with the already input item data are required. In order to acquire the necessary input item data, a slip type item data for storing the necessary input item data is used. The input prompting function is a function of prompting an item which is not yet input. More specifically, the input prompting function is a function of flickering a noninput item or generating a buzzer tone to prompt an input. The automatic setup function is a function of automatically setting slip data of some items. This automatic setup function has a branch office code setup function and an analogous inference setup function. The branch office code setup function is a function of determining a branch office installed with the terminal unit 21 in accordance with a number assigned to the terminal unit 21 at which slip data for forming an electronic slip record is to be formed, and of automatically setting the corresponding branch office code. The analogous inference setup function is a function of analogously and automatically inferring some noninput item data from the already input item data. In order to realize this function, a method of utilizing an analogous inference table corresponding to input data or a method of acquiring noninput item data by calculating the already input data is used. The account title setup function is a function of setting an account title of each item in accordance with each detailed accounting event. The detailed accounting event is a single event or a combination of a plurality of events. The account title setup function allows setup of account titles such as a business trip transportation expense, expendable expenses, and expenses of books in electronic slip records. The account title setup function will be described in detail later on.

The slip data input from the terminal unit 21 by the above input processing is subjected to check processing for checking whether the input data is correct. The check processing includes four functions, i.e., an input enable check function, an item attribute check function, an item range check function, and an item comparison check function. The input enable check function is a function of comparing input data with the input enable determination data registered in the master table 15 to check whether the input data is input enable data. The item attribute check function is a function of comparing input data with attribute data of items registered in the master table 15 to check whether attribute data of the input item coincides with that of the registered item. An item attribute represents characteristic information of each item such that "an item A causes an error unless it is data except for a numeric value". The item range check function is a function of comparing input data with maximum range data of each item registered in the master table 15 to check whether the range of the input item coincides with that of the registered item. The item range represents allowable value information of each item such that "item A causes an error unless it takes 1, 2, or 3". The item comparison check function is a function of comparing the input data with data representing a correlation between items registered in the master table 15 to check whether a correlation between the items of the input data is correct. A correlation between the items is a predetermined relationship between the items defined such that "if the item A is 1, an item B is correct, provided that the item B is 3 or 4". The correlation data between the items registered in the master table 15 are stored in units of slip types, thereby improving access efficiency.

Since the input slip data is determined to be correct data by the above check processing, a slip management number is assigned to the formed electronic slip record. An abbreviated code (slip ID and month) is used at the time of an input operation, but a full code (branch office, date, and slip ID) is set in each electronic slip record. This number assignment processing includes a latest number generation function. The latest number generation function is a function of generating a latest slip management number in response to a request from the terminal unit 21 and is realized by using latest number data registered in the master table 15. The latest number data registered in the master table 15 is stored in units of slip types or slip issuance years, thereby improving access efficiency and facilitating discrimination of user ID numbers.

(3.3) Approval-Settlement Processing

Figure 25:
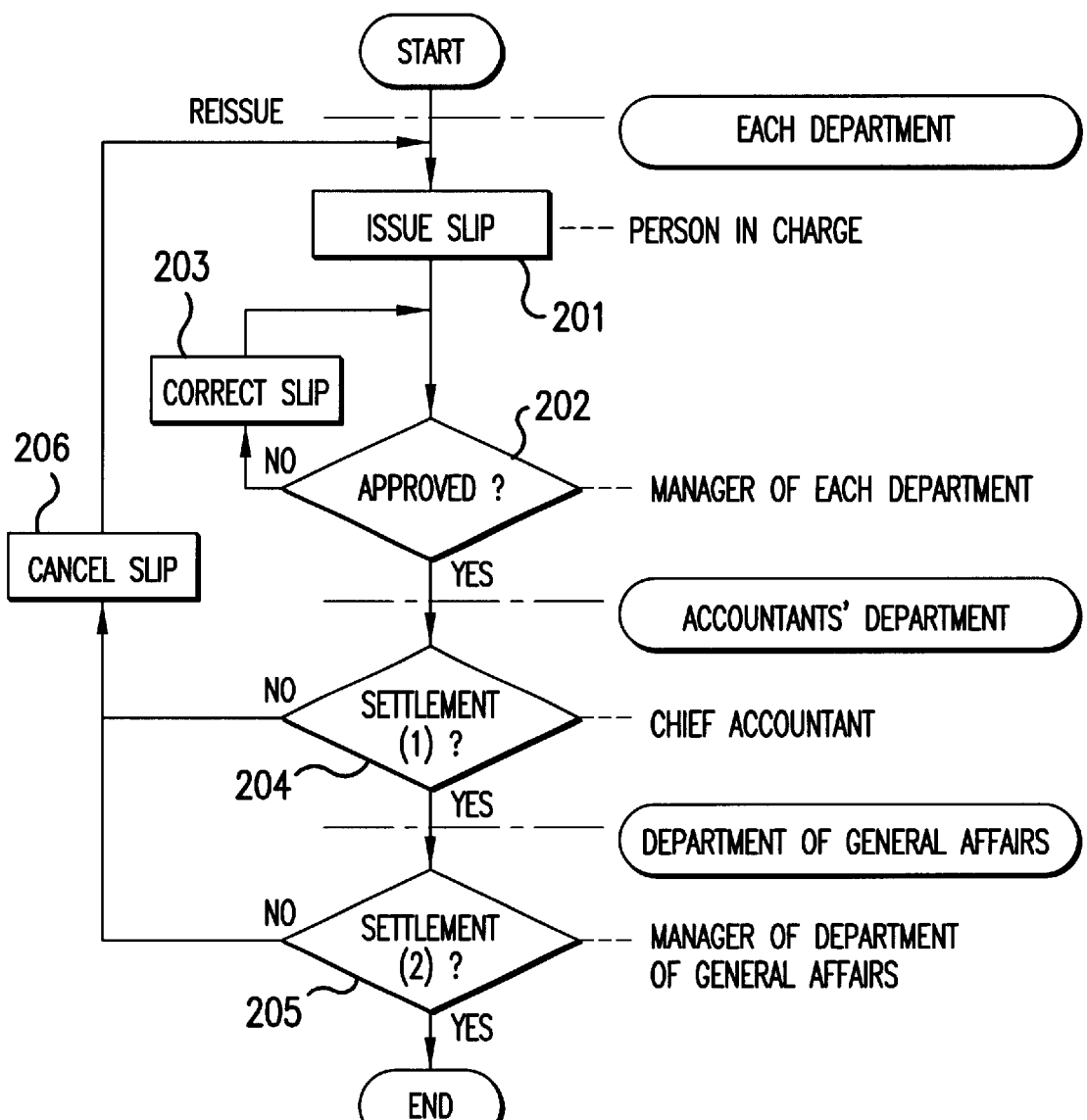
FIG. 25 is a view showing a flow of approval settlement processing of this embodiment.

Approval settlement processing will be described with reference to FIGS. 25 to 28. FIG. 25 is a flow chart showing a flow of approval-settlement processing. As described in the input processing, when a person in charge in the sales department forms an electronic slip record by using the terminal unit 21, this electronic slip record is stored in the magnetic disk or disk unit 11 as a nonhandled slip (step 201). In order to approve nonprocessed slips issued by the sales department once a day, the manager of the sales department displays a list of nonprocessed slips on the terminal unit 21. This list is formed by selecting electronic slip records of pieces of status information which represent the levels prior to approval processing. The manager extracts electronic slip records which will be approved by himself. The manager then manipulates the terminal unit 21 to display specification information of the extracted electronic slip records on the screen. The pieces of displayed specification information are explanations, content statements, account titles, amounts, and handlers or persons in charge. When the manager determines that each electronic slip record is to be approved, he enters an approval input (step 202). When the manager determines that an electronic slip record cannot be approved due to descriptive incompletion, status information is returned to prompt or to cause the person in charge to correct the slip. In this manner, when the electronic slip record is not approved, the person in charge corrects the descriptive incompletion (step 203). The electronic slip record free from the descriptive incompletion is approved by the manager, so that its status information is changed to a level which allows settlement in the accountants' department or the personnel department as the settlement department. A person in charge in the accountants' department or the personnel department displays the list of nonprocessed slips on the terminal unit 31 in the same manner as the manager of the sales department, thereby displaying the specification information of the nonprocessed slips. If the person in charge judges that a settlement can be made by this display, he inputs settlement data to change the status information to a level which allows daily batch processing. Of these nonprocessed slips, slips to be settled are settled by settlement inputs (steps 204 and 205). If a given electronic slip record cannot be settled due to some problem, the person in charge returns the status information to a level which prompts cancellation. The person cancels this electronic slip record in the following procedures (step 206). The person in charge uses a function of displaying a list of states of slips issued by himself and knows that a slip issued by himself has a level at which the slip is disapproved. In order to observe its details information, a function of retrieving its electronic slip record is used, thereby displaying the details of the record on the screen. The function of retrieving this electronic slip record allows retrieval using a slip number, a slip issuer ID number, and a slip type as retrieval keys. The person in charge knows disapproval of a specific settlement request and starts the request input function, thereby canceling this request. He then checks the content of the processing again and enters a password as his personal ID number so as to check that the person who cancels the request is himself with reference to the master table 15. A flag representing cancellation and the date of cancellation are written in specific areas of the electronic slip record. At this level, the actual electronic slip record is not deleted, and the flag represents a canceled state. After cancellation processing of the electronic slip record is performed, and a corrected electronic slip record free from the problems is reissued using the terminal unit 21.

Detailed display contents in approval processing are shown in FIGS. 26 to 28. A desired item as processing classification, a department number, and an approval person post number are input (FIG. 26). If an item except for items 1 to 3 in processing classification is input, an error occurs. The department number and the approval person post number are compared with data registered in the master table 15. If these numbers are correct, a list of data required for approval is displayed (FIG. 27). A slip subjected to approval processing is selected from this list, and its slip number is input. Detailed data of an electronic slip record of the input slip number are displayed (FIG. 28). The detailed data are explanations, contents, and account titles, all of which are registered in the electronic slip record. The person in charge inputs whether approval can be made with reference to these detailed data. After approval processing of this slip is completed, he performs a key input to determine whether approval processing of another slip is to be continued. If letter "E" is entered and his password is input, the approval processing is ended.

(3.4) Approval-Settlement Processing Requiring Receipt

Figure 29:
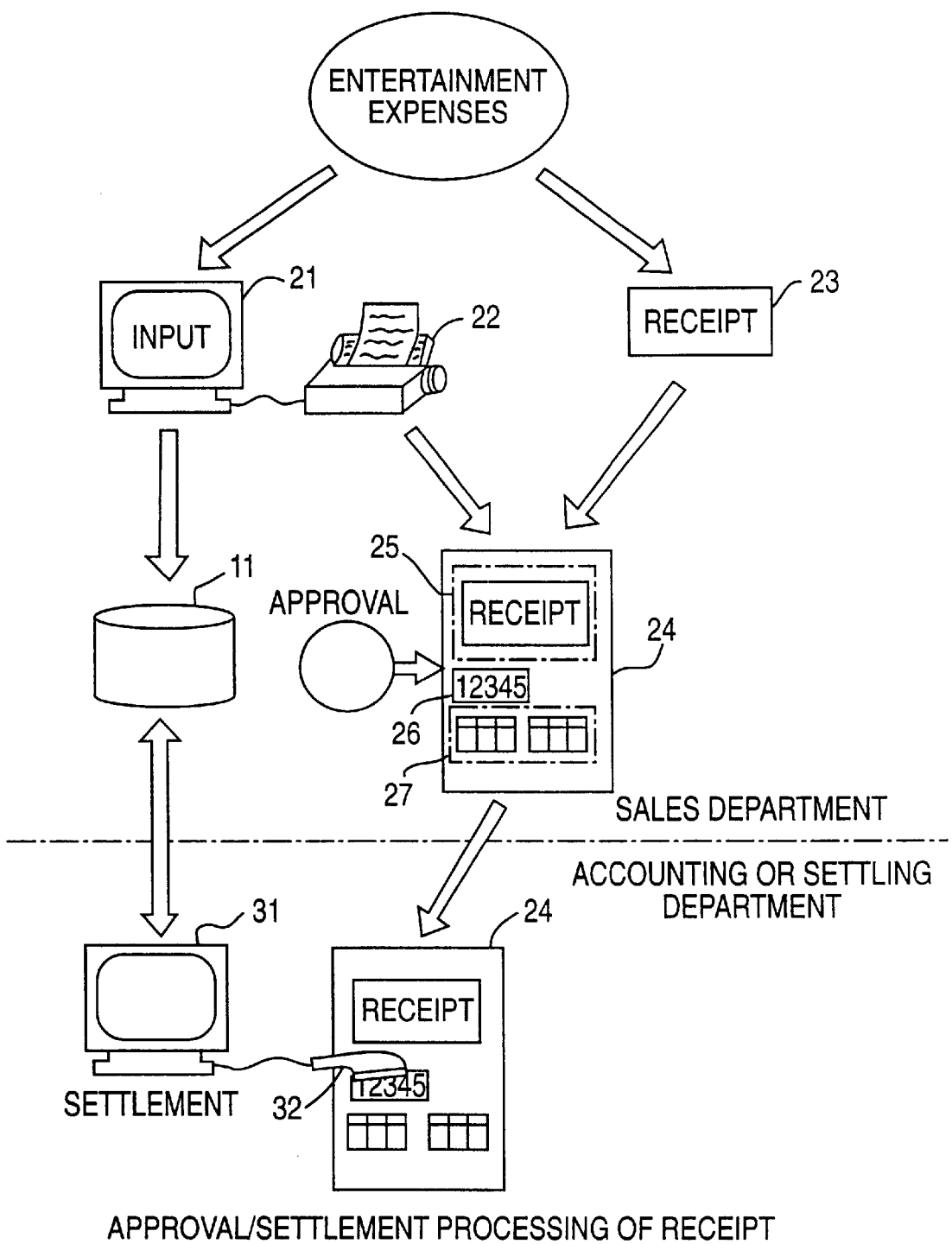
FIG. 29 is a view showing approval settlement processing using a receipt according to this embodiment.

Approval settlement processing requiring a receipt will be described with reference to FIGS. 29 to 35. FIG. 29 is a view showing approval settlement processing requiring a receipt. When a person in charge in the sales department uses a taxi and has an entertainment with a customer, a receipt 23 is issued. In order to liquidate the entertainment expenses and the like, the sales person forms an electronic slip record using the terminal unit 21. A system determines whether to attach a receipt to this electronic slip record in accordance with the type of slip and causes the printer unit 22 to automatically output the attached card 24. The attached card 24 includes an adhesion portion 25 for adhering a receipt, a slip number portion 26 in which a slip number of the electronic slip record is described, a signature portion 27 for causing a person in charge to sign his name, and a slip detailed data portion (not shown). Information of an approval route may be read out from an approval settlement table stored in the master table 15 and may be printed on the attached card 24. The person in charge adheres the receipt 23 to the adhesion portion 25 of the attached card 24, asks the manager to sign his name in the signature portion 27, and transfers it to the settlement department. In the settlement department, the slip number portion 26 of the attached card 24 to be settled is read by the hand scanner 32. Settlement processing of the electronic slip record corresponding to the read slip number is performed. The settlement processing itself is the same as the settlement processing without a receipt. The electronic slip record settled as described above is registered in the disk unit 11 as a settled electronic slip record.

Figure 33:
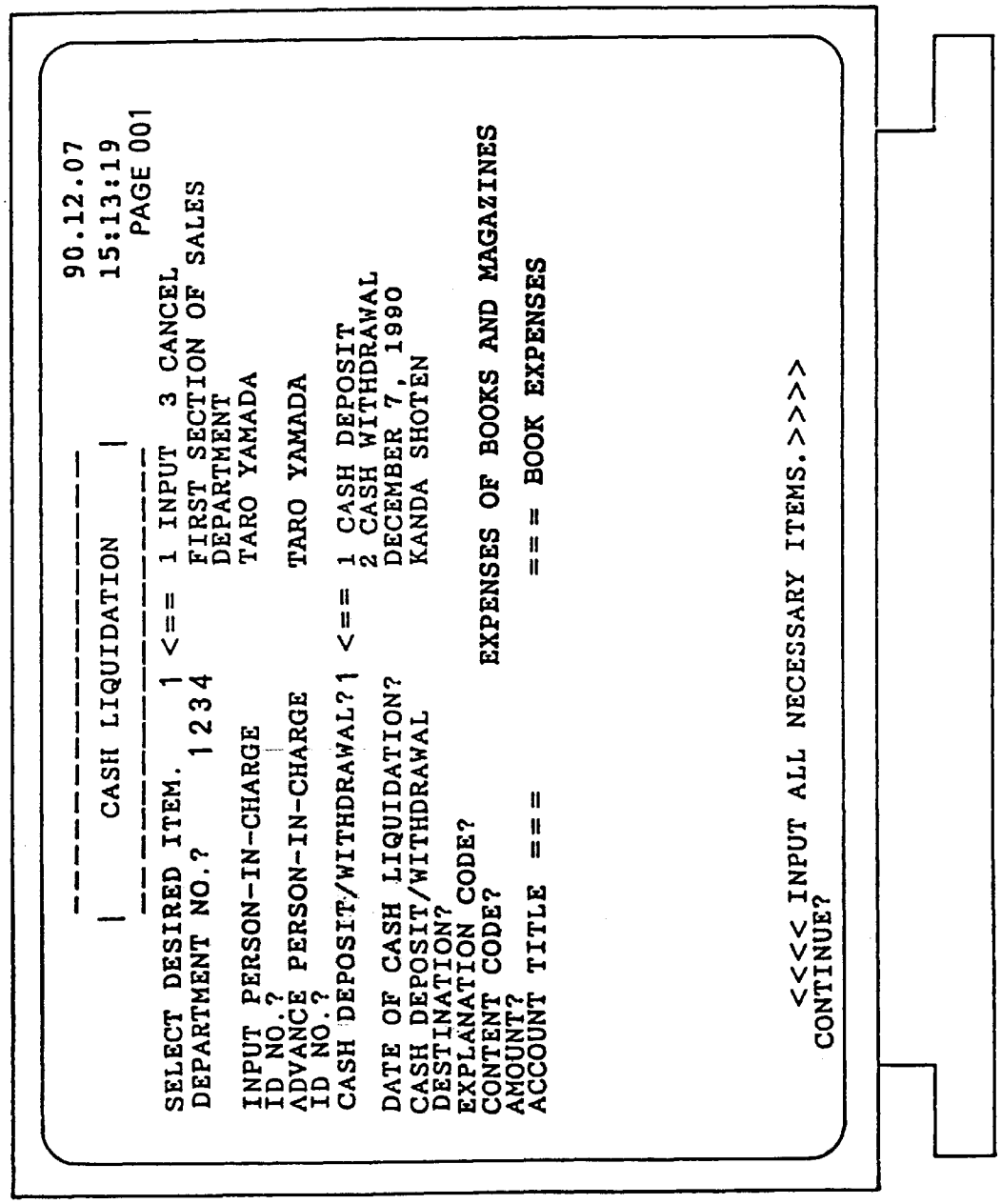
FIG. 33 is a view showing a screen content in the slip formation processing of this embodiment.

Detailed display contents of slip formation processing accompanying an output of the attached card 24 are shown in FIGS. 30 to 35. A desired item in processing classification, a department number, an input operator post number, an advance person post number, cash deposit/withdrawal classification, the date of cash liquidation, cash deposit/withdrawal destination are input (FIG. 30). If any item except for items 1 and 3 is input in processing classification, an error occurs. In the cash deposit/withdrawal classification, item 1 (deposit) or 2 (withdrawal) is input. An input advance person post number is compared with personnel data registered in the master table 15. When the input advance person post number is not registered in the personnel data, an error occurs. A list of details codes is displayed, and the corresponding code number in the list is input (FIG. 31). In this case, when a code which is not included in the list is input, an error occurs. When the corresponding explanation is not present in the master table 15, a value of "999" is input and an explanation is input. Similarly, a list of the content code is also displayed, and the corresponding code number is input (FIG. 32). In this case, when a code which is not present in the list is input, an error occurs. When the corresponding content statement is not present in the master table 15, a value of "999" is input, and the corresponding content statement is then input. After these inputs, the account titles and journalization are automatically set in accordance with the account title setup function and are displayed on the terminal unit 21. The following processing is performed. If the details statement content input in the previous processing is not "999", the account title master in the master table 15 is referred to, and the journalization registered in the account title master is automatically set and is displayed on the terminal unit 21. The details content input in the previous processing is "999", an account title code is directly input. If the input account title code is registered in the account title master, its journalization is automatically set and is displayed on the terminal unit 21. A numeric value having a maximum of eight digits is input as an amount of liquidation (FIG. 33). A maximum amount to be demanded is ¥99,999,999. An expense planning number and an item in consumption tax classification are input (FIG. 34). If the above inputs are correct, letter "E" is input to complete the processing (FIG. 35). If a plurality of liquidation data to the deposit/withdrawal destination are present, or different accounting processing operations are to be performed, letter "C" is input to repeat the processing. The number of times of repetition is a maximum of 3. When the processing is completed, the attached card 24 is automatically output from the printer unit 22.

(3.5) Processing of Receipts and Disbursements

Figure 36:
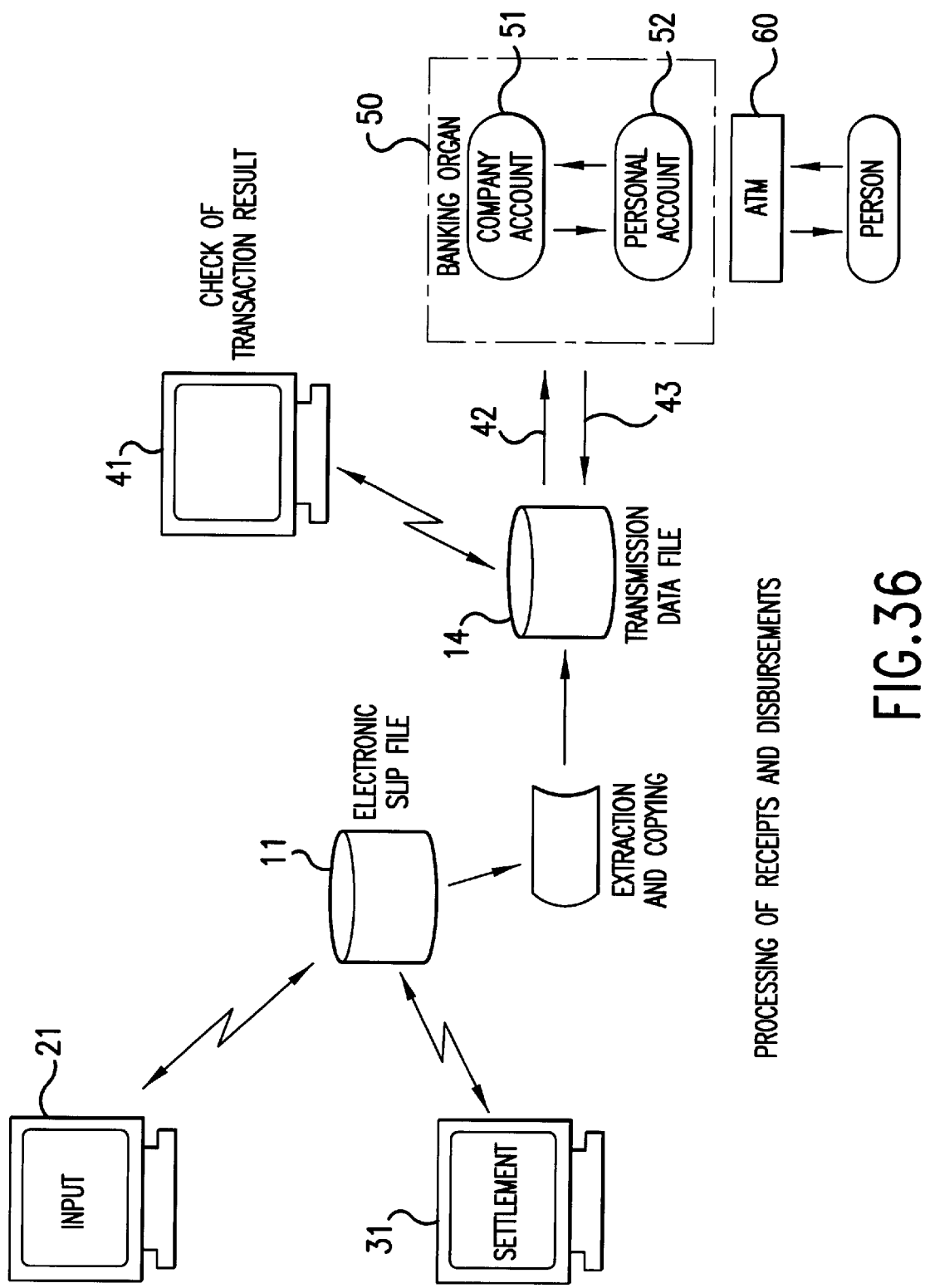
FIG. 36 is a view showing processing of receipts and disbursements according to this embodiment.

Processing of receipts and disbursements will be described with reference to FIG. 36. An electronic slip record formed in the disk unit 11 by the terminal unit 21 is settled by the accountants' department after it is approved by the manager who belongs to the department in which this electronic slip record is formed. Even if its status information is set at a level where daily batch processing of this record is allowed, the record is kept stored in the disk unit 11 until the batch processing is actually performed. This electronic slip record is stored in the database 12 by a normal daily batch transfer processing operation. If an electronic slip record requires processing of receipts and disbursements, it is copied, and independent processing is performed. That is, a slip requiring processing of receipts and disbursements such as business trip request/liquidation, advance payment request/liquidation, and cash liquidation is extracted and copied by the CPU before it is subjected to match transfer processing. The copied electronic slip record is stored in the disk unit 11 serving as a selected-slip storage unit and serves as receipts-disbursements processing data used in the banking organ 50. This extraction-copying processing is closed once a day, and the daily data is transferred from a line 42 to the banking organ. The banking organ 50 performs processing on the basis of the transferred electronic slip record data. For example, when liquidation processing of business trip expenses is to be performed, an amount corresponding to the business trip expenses and a business trip allowance is withdrawn from a company account 51 and is transferred to a personal account 52 designated by the slip issued by the company. The processing results are returned to the disk unit 14 through the line 43. The processing results and data stored in the disk unit 11 can be checked using a terminal unit 41 installed in each department. When processing of transfer to the personal account 52 is normally performed, the transferred cash can be withdrawn from an ATM machine (Automatic Teller Machine) 60 installed within or around the company.

(3.6) Batch Processing

Figure 37:
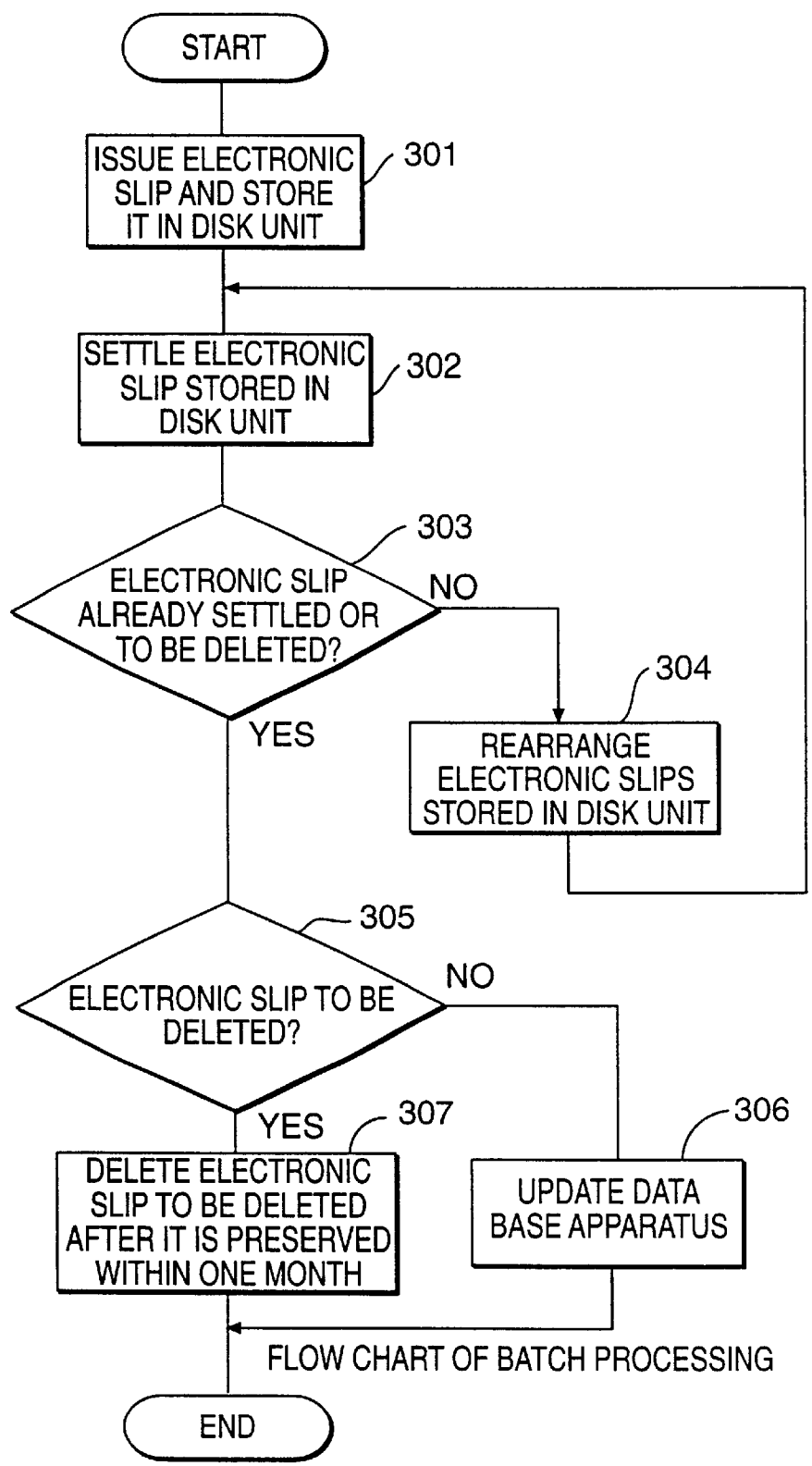
FIG. 37 is a flow chart showing batch processing of this embodiment.
Figure 38:
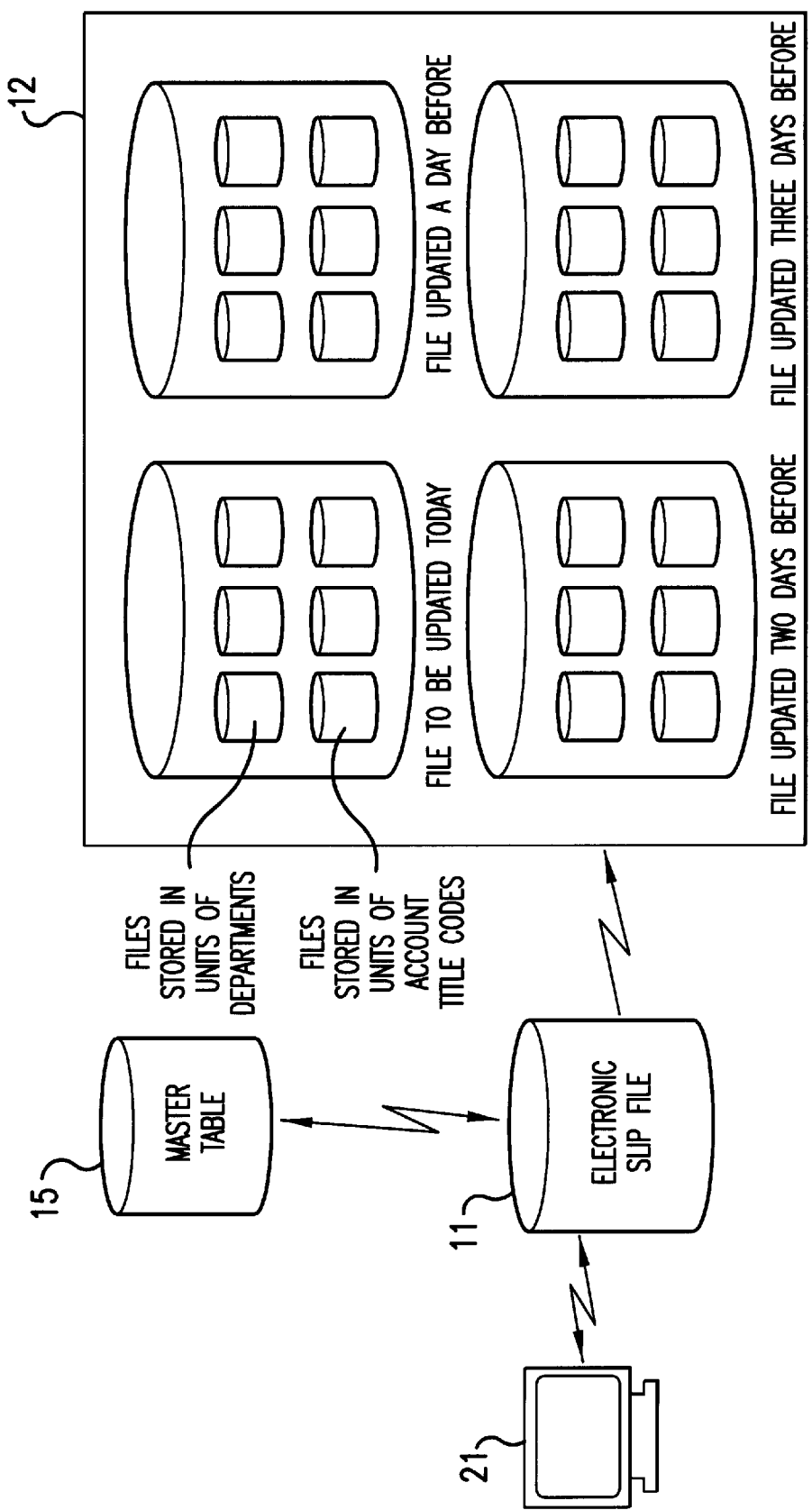
FIG. 38 is a view showing an arrangement of a database unit.

Batch processing will be described with reference to a flow chart in FIG. 37. An electronic slip record formed in the disk unit 11 by the terminal unit 21 is settled by the accountants' department after it is approved by the manager who belongs to the department in which this record is formed. The record is kept stored in the disk unit 11 until the batch processing is actually performed even if its status information is set at a level in which the record can be processed by daily batch processing (steps 301 and 302). Of all the electronic slip records, a settled electronic slip record or an electronic slip record to be reissued or erased is extracted by the CPU (step 303). This extraction is performed once a day. The electronic slip records which are not extracted by this extraction processing are rearranged within the disk unit 11 (step 304). It is checked whether an electronic slip record to be erased is included in the extracted electronic slip records (step 305). If an electronic slip record to be erased is present, it is extracted from the disk unit 11 and is erased after a lapse of a month (step 307). The remaining electronic slip records are transferred to the database unit 12 serving as a backup unit in the batch processing, thereby updating the database unit 12 (step 306). Update processing of the database unit 12 in step 306 will be described with reference to FIG. 38. As shown in FIG. 38, in this embodiment, four-day data are stored in the database. In this sense, database up to the fourth preceding day can be restored. A plurality of member files are stored in the database of one day, and data classified in accordance with application purposes such as a spreadsheet calculation in units of departments and account title codes are stored. The same data may be stored in different member files. Necessary data can be accessed by selecting an optimal member file from this member file group.

(3.7) Confidentiality Processing

Confidentiality processing will be described below. A password check is available as confidentiality processing when approval settlement processing and cancellation processing of electronic slip records and special slip input processing are performed. The password check is a procedure wherein a unique character string (password) is registered in the master table 15 in advance, and a personal ID number and a password are input as final confirmation factors for performing settlement processing and cancellation processing, thereby checking that the operator is an authorized person. This password can be easily changed. A person in charge periodically changes the password to make an effort to improve confidentiality.

(3.8) Processing Using Master Table

Figure 39:
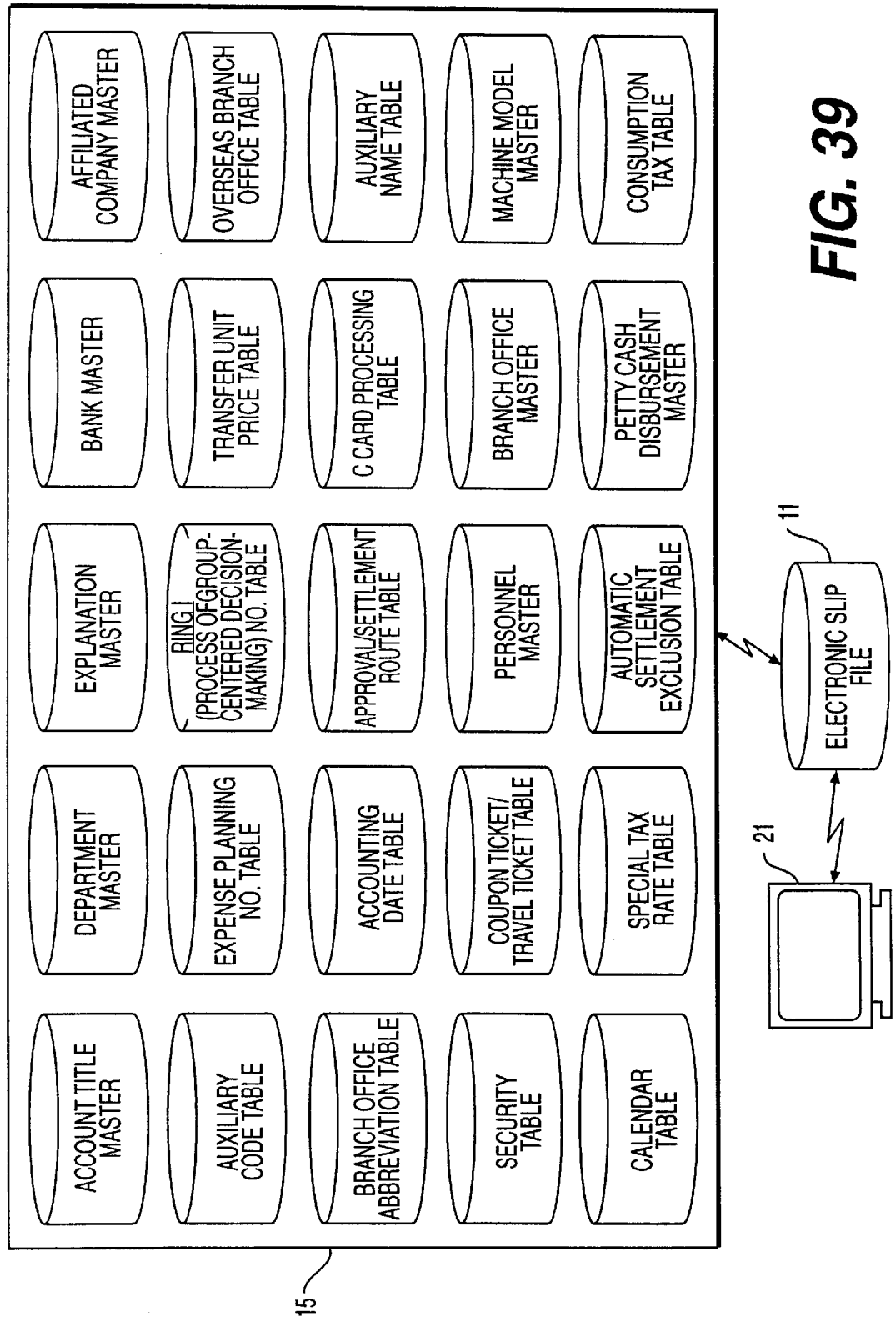
FIG. 39 is a view showing an arrangement of a master table.

Processing using the master table 15 will be described below. FIG. 39 is a view showing the master table 15. The master table 15 is constituted by several tens of master files such as an account title master, a department master, and an explanation master. In this case, the number of master files can be increased or decreased. Some master files will be described below. The account title master performs management of basic information such as attributes, names, and consumption expense check classification and performs output management as of a general ledger and financial statements. The department master performs check management of settlement places, a sub accounting unit, and slip issuance. The explanation master performs setup management so as to allow automatic input of journalization on slips by simply selecting and inputting an operator's department code and contents of events from the choices. These master files are used for input processing such as processing for determining whether input data is correct, processing for displaying a list of input data, and processing for automatically setting input data. The department master and the personnel master are used in the processing for determining whether input data is correct. That is, the input data is determined to be correct or not by utilizing data registered in these master files. The explanation master and the coupon ticket/travel ticket table are used in the processing for displaying a list of input data. Data stored in the master and the table are displayed in a list. An accounting date table and the consumption tax rate table are used in processing for automatically setting input data. The input data are automatically set on the basis of data registered in these master files. In particular, by the consumption tax rate table, a correct consumption tax (3% or 6%) is calculated for each event, and an amount including the tax is automatically set. A security table is used to check an authorized person for confidentiality processing.

In the paperless accounting system of the present invention, even if a person is not accustomed to accounting, a slip can be easily formed by simply inputting data in necessary items displayed on menu screens having different menus in accordance with different types of slips. Errors of input slip data are automatically checked. Even if erroneous data are input, they can be corrected on the spot. The finished electronic slip files are assigned with slip numbers, respectively.

According to the paperless accounting system of the present invention, a person in charge who forms a slip inputs slip data by using a local processing apparatus. Since different menu screens depending on types of slips to be formed are displayed on the local processing apparatus, the person or operator can easily input slip data in accordance with prompts of the desired menu. The checking means checks whether the input data is valid. When the input slip data is determined to be valid by the checking means, a slip number is assigned by the assigning means.

According to the paperless accounting system of the present invention, the electronic slip formed by the electronic slip forming means is stored in the first electronic slip storing unit. A slip requiring receipts-disbursements processing is selected from the slips stored in the first electronic slip storing unit and is copied by the receipts disbursement slip extracting means, and the copied slip is stored in the second electronic slip storing unit. A transaction with a banking organ is managed by the transaction manager on the basis of the electronic slip data stored in the second electronic slip storing unit.

According to the paperless accounting system of the first embodiment of the present invention, the electronic slip formed by the electronic slip forming unit is stored in the electronic slip storing unit. Additional processing of the electronic slip data stored in the electronic slip storing unit is performed by the additional processer Access of the electronic slip in the electronic slip forming unit or the additional processer means is performed by the electronic slip access unit by using the index as a combination of a plurality of key items of the electronic slip.

According to the paperless accounting system of the second embodiment of the present invention, the electronic slip formed by the electronic slip forming unit is stored in the electronic slip storing unit. Additional processing of the electronic slip data stored in the electronic slip storing unit is performed by the additional processer Determination of matching between the electronic slips stored in the electronic slip storing unit and the basic data registered in the master table unit is performed by the master data determining unit.

According to the paperless accounting system of the present invention, an electronic slip requiring preservation of a receipt is selected by the adhesion card issuing unit from the electronic slips formed by the electronic slip forming unit. Receipt adhesion cards respectively corresponding to the selected electronic slips are issued. The electronic slips are transferred to the additional processor and are subjected to additional processing. The managing unit manages the electronic slip processing state in the electronic slip forming unit and the additional processing unit.

According to the paperless accounting system of the present invention, an electronic slip is formed by electronic slip forming unit in accordance with designation by the managing unit. Additional data processing of the formed electronic slip is performed by any additional processor in accordance with designation by the managing unit.

According to the paperless accounting system of the present invention, the electronic slip formed by the electronic slip forming unit is stored in the electronic slip storing unit. Only an electronic slip of a predetermined processing state selected from the electronic slips stored in the electronic slip storing unit is extracted, and the extracted electronic slip is transferred to the database unit every predetermined period. The content of the database unit is updated by using the transferred electronic slip data.

According to the paperless accounting system of the present invention, an electronic slip formed by the electronic slip forming unit is subjected to additional data processing by the additional processor. These additional processing operations are determined as valid data when a user is determined as an authorized user in accordance with the user limiting function.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A paperless accounting system for processing expense reimbursements comprising:

a host processor having an accounting information database for processing paperless accounting slips containing data relating to expense reimbursements; and a local processor, remotely connected to said host processor, for creating a paperless accounting slip from input data, the input data including a plurality of input items concerning expenses, said local processor including:

an input device, having an automatic setup function, for automatically setting unentered input items of a new paperless accounting slip inferentially from previously entered input items of the new paperless accounting slip;

a display for displaying menu screens having different sets of input items for different types of paperless accounting slips;

a checker, coupled to said input device, for checking validity of the input data, wherein said checker performs an input item comparison check function for checking validity/invalidity based upon a correspondence between different input items of the input data of a paperless accounting slip; and an assignment device for assigning a slip number to a paperless accounting slip having input data determined as valid by said checker.

* * * * *